(12) United States Patent
Chang

(10) Patent No.: US 9,917,635 B2
(45) Date of Patent: Mar. 13, 2018

(54) DISTRIBUTED SATCOM APERTURE ON FISHING BOAT

(71) Applicant: Donald C. D. Chang, Thousand Oaks, CA (US)

(72) Inventor: Donald C. D. Chang, Thousand Oaks, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 42 days.

(21) Appl. No.: 14/203,386

(22) Filed: Mar. 10, 2014

(65) Prior Publication Data

US 2014/0198709 A1    Jul. 17, 2014

(51) Int. Cl.
  *H04B 7/185*    (2006.01)
(52) U.S. Cl.
  CPC ..... *H04B 7/18526* (2013.01); *H04B 7/18578* (2013.01)
(58) Field of Classification Search
  None
  See application file for complete search history.

(56) References Cited

U.S. PATENT DOCUMENTS

| | | | | |
|---|---|---|---|---|
| 2003/0203733 A1* | 10/2003 | Sharon | ............... | H01Q 1/288 455/427 |
| 2011/0032173 A1* | 2/2011 | Chang | ............... | H01Q 3/04 343/880 |
| 2011/0265128 A1* | 10/2011 | Bengeult | ............... | H04B 7/18508 725/64 |
| 2012/0051284 A1* | 3/2012 | Chang | ............... | H04B 7/2041 370/316 |
| 2012/0069918 A1* | 3/2012 | Chang | ............... | H04B 7/086 375/259 |
| 2014/0227967 A1* | 8/2014 | Savage | ............... | H04B 7/18517 455/12.1 |

* cited by examiner

*Primary Examiner* — Edan Orgad
*Assistant Examiner* — Saumit Shah

(57) ABSTRACT

Signals of data streams for transmission to user equipment (UE) in spoke-and-hub configurations will utilize multiple transponders of satellites. Radiation patterns from ground terminals with distributed apertures feature orthogonal beams (OB). A tracking OB beam from a moving platform dynamically shall autonomously be formed as a shaped beam by a digital-beam-forming (DBF) network with a peak to a desired satellite, and nulls to undesired satellites to minimize mutual interferences among multiple satellite spatially. Ground hubs and mobile terminals feature "coherent" bandwidth aggregating capability from multiple available but non-contiguous slices of frequency slots in many transponders by wavefront multiplexing/demultiplexing (WF muxing/demuxing) techniques. These individual frequency slots must be dynamically selected, calibrated and equalized continuously in receivers via embedded probing signals as a part of WF muxing/demuxing techniques.

19 Claims, 23 Drawing Sheets

Fishing boat Satellite Communications Operation distributed C-band array with 7 elements

1. C-band array element apertures : each with ~ 20" in diameter
2. Baseline circle diameter > 3 meter (120 inches)
3. Active apertures with distributed PAs
4. Digital beam forming with multiple beam capability
5. Dual circular polarizations 430 C-band Satcom Array Elements 420 L/S-band cell and/or WiFi Onboard Mini hub

410

*SDS PROPRIETARY*

SDS Design Information

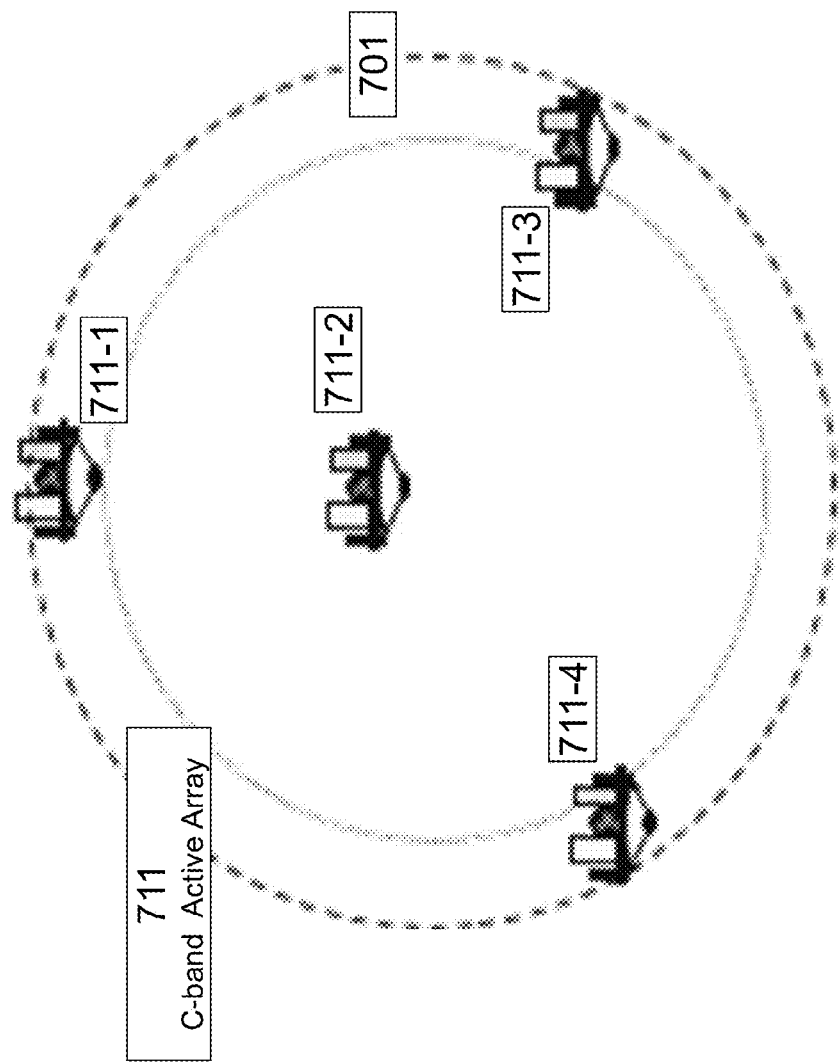

DISTRIBUTED SATCOM APERTURE ON FISHING BOAT

CROSS REFERENCE TO RELATED APPLICATIONS

U.S. patent application Ser. No. 13/172,620, filed Nov. 29, 2012, entitled "Accessing LP transponders with CP terminal via Wavefront Multiplexing Techniques," is incorporated herein by reference in its entirety. U.S. patent application Ser. No. 13/778,171, filed Feb. 27, 2013, entitled "Multi-Channel Communication Optimization Methods and Systems," is also incorporated herein by reference in its entirety.

TECHNICAL FIELD

This disclosure describes exemplary embodiments on improving the operation and use of satellite communication methods and systems such as through concurrent data delivery with redundancy and privacy ranking and related calibration. The present invention relates to smart antenna methods on fishing boats providing affordable communications services for fishing boats community in coastal regions via satellites and/or airborne platforms such as UAVs.

There are two sets of communications payloads on fishing boats; one in foreground to interface with users on a boat via their own personal mobile communications devices such as cell phones, laptops, and other advanced personal handhelds such as IPads or Surface tablets. Most of these devices are both using cell services frequency bands and WiFi accessible. The other payload in the background, also referred as "back channel communications," is connecting to land based gateways, via a satellite mobile VSAT service at Ku, C and/or other available frequency bands, which may communicate with other land based communications infrastructures. The distributed apertures on a boat are for the satellite communications links and shall provide good quality of service for the back channel communications.

The disclosed embodiments may also be extended using airborne platforms as surrogated communications satellites, including UAVs on improving operation and use of back-channel communication methods to the gateways.

A service provider may provide many dynamic communications architectures for different groups fishing boats concurrently. For a first service group which subscribes one group of embodiments, the architectures for communications among many fishing boats are spoke-and-hub type via land based ground gateways. For a second service group which subscribes another group of embodiments, the architectures for communications among many fishing boats are mesh type with very little engagement via land based ground gateways. For a third service group which subscribes a third group of embodiments, the architectures for communications among many fishing boats are spoke-and-hub type but via boat-based gateways, which are connected to land based ground gateways via point-to-point type of connectivity. Both types of connectivity may be through satellites, UAVs, or combinations of satellites and UAVs.

Service providers may support other groups of services featuring combinations of all above-mentioned connectivity through both commercial satellites and UAVs performing communications relays.

We shall use satellite communications as examples for these applications. Those who are familiar with the technologies shall be easily develop similar architectures via airborne platforms

BACKGROUND

It is expensive to build a communications networks for fishing boats on coastal regions. As IP services continuously expand over land mass, it becomes more demanding beyond the land mass coverage. Current communications infrastructures are either not adequate to reach these moving platforms on sea, to support adequate bandwidths, and/or to be too costly to service these communities. Not aiming for a goal of having a link to every users on a fishing boat, we are aiming for wideband IP connectivity to a small moving ocean surface vehicle which will efficiently aggregate and distribute all IP traffic dynamically on the platform to/from gateways on land via satellites or UAVs. There are three required elements on board moving platforms to make a coastal communications system successful; (1) user's communication equipment, (2) aggregating and distributing equipment, and (3) communications equipment connecting the platform to/from IP gateways on lands.

In order to support a coastal satellites communications system, it is desirable to develop antennas with a distributed aperture on fishing boats for satellite communications (Satcom) capability. An objective system that can be used over the existing commercial communications satellites covering coastal regions of Asia, features both C, Ku, and other commercial communications bands, such as those from many commercial satellite operators, including those in Asia operating Chinasat 5, Chinasat 12, and those of ST-2, covering West Pacific, and part of Indian Ocean.

There are many current Satcom terminal development efforts supporting various frequencies. Size, weight, and power (SWaP) are usually design drivers. These efforts are struggling with integration issues for different hosting moving platforms/vehicles. There are other constraints on vehicle antennas besides the key design driver with a low size, weight and power consumptions (SWaP). The desired solutions take into account of vehicle integration issues, featuring (1) flexible and scalable approaches with multiple smaller apertures and (2) minimized physical footprints for easy installation, such as on a short mast, and limited volume for installation.

As to the flexible and scalable approach with multiple smaller apertures, the designs must be configurable to different small vehicles accommodating re-calibrations and testing at final integration. In addition, the designs may consist of different types of subarrays or elements without impacting overall communications performance. These arrays shall be distributed on the topside of an ocean surface vehicle operating coherently, and may not be plannar.

As to the minimized physical footprint for easy installation, the designs shall be low profile apertures to avoid the presence of high physical profile and excessive high wind loading, and shall tolerate "soft" blockage to commercial SATCOM space assets of Geo-synchronous satellites, taking advantage of elements not with hemispherical FOV.

Uniqueness of Approach

In order to achieve low cost and cost effective IP communications for fishing boats, there are several advanced communications technologies involved using available space assets efficiently and dynamically;

From point of view of operation aspects: linear polarized (LP) Ku band space assets will be used to service circularly polarized (CP) mobile platforms to enable power and bandwidth sharing via coherent WF muxing/demuxing. It will be an economical way to use fixed-service-satellite (FSS) assets servicing mobile users without expansive dynamic polarization realignment mechanisms. This asset sharing via polarizations among users with more private communications and redundant communication channels are benefits derived from coherent WF muxing/demuxing.

For service of East Asia market, one shall explore lower cost space assets available from various provider such as ChinaSat in China and JSat in Japan. WF muxing techniques offer the capability of aggregating dynamically available communications assets from multiple satellite concurrently. The communication architectures feature always with dynamic assignments of multiple concurrent channels for communications; which may not from the same operators.

Communications with existing small aperture terminals with <85 cm in diameters for Ku VSAT on mobile platforms usually feature spread spectrum to minimize interferences to/from adjacent Ku satellites; with significant reduction in efficiency of bandwidth utility. Distributed aperture arrays are designed for OB beams to minimize interferences to/from adjacent satellites. These OB beams are multiple beams pointed to many satellites concurrently and dynamically. The arrays usually feature (1) numbers of RF power amplifiers with more graceful degradation and thus more reliable and less cost, (2) a cost effective tracking mechanisms, (3) in field recalibration capability as built-in features, and (4) Orthogonal-beam (OB) beam forming techniques for enhancements of low interferences.

It is the purposes of the proposed satellite communications systems serving communities of fishing boats by taking advantages existing space assets at Ku and C-band. It is the capability of aggregating multiple unused space assets from many different satellites to function as a resourceful virtual transponder. Such an operation shall not rely on one satellite operator. The participating transponding satellites may include small portion of unused existing assets of many active GEO satellites, retired ones in slightly inclined orbit periodically, or/and low orbit satellites over coverage areas for a short period of connectivity services individually.

Our initial phase shall focus on Ku band service near coastal regions. The proposed open architecture shall be easily expandable to cover many mobile platforms over deep blue oceans beyond coastal region via Ka, Ku and C-bands. These mobile platforms include earth surface and air borne ones.

Since most existing and available space assets are in linearly polarized (LP) commercial fixed service satellites (FSS) while circularly polarized (CP) terminals are easier to installed on moving platforms and cost less to operate, it becomes our unique service features of using LP space assets to service CP terminals via wavefront multiplexing/de-multiplexing (WF muxing/demuxing) techniques; as outlined in the referenced SDS inventions [1, 2, 3].

There are many existing Ku band mobile VSAT types of terminals featuring gimbaled apertures with diameters less than 1 meter. These apertures are usually linearly polarized (LP) using existing Ku band fixed-satellite-service (FSS) satellites which are linearly polarized (LP) space assets. Since they are on mobile platforms; these apertures require 2 axis position tracking and an additional mechanism for polarizations realignments. These mobile VSAT systems usually feature increased network efficiency through advanced mobile terminal burst transmission, and optimized capacity enabled by closed loop power control and advanced network management. However, their apertures may be as small as 50 cm and as big as 85 cm with linear polarizations. Since such small apertures, adjacent Ku satellites at ±2° shall be in the main beams of these apertures when these VSAT terminals are operating; either in a transmitting and/or a receiving modes. To maintaining reliable Ku-band communication, without harmful adjacent satellite interference issues, additional modifications from conventional VSAT networks are used via spread spectrum waveforms. Usually the spreading are 2-to-1 (or 4-to-1) using twice (or 4 times) more bandwidths to provide a 3 (or 6 dB) more isolation.

In an extreme, a 50-to-1 spreading in frequency spectrum shall provide 17 dB additional isolations to assure minimized mutual interferences to and from adjacent Ku satellites be in an acceptable level. As a result, the efficiency of bandwidth utility unfortunately shall be reduced accordingly by a factor of 50. For instance, an allocated satellite channel of 1 Mbps for a conventional fixed VSAT with 1 m or 1.2 m apertures, can only support a channel capacity of 20 kbps data transport for a mobile VSAT with 50 to 85 cm apertures when a 50-to-1 spread spectrum waveform is used.

SDS proposes different approaches for the mobile VSAT exhibit the following features;
 i. Distributed apertures for the mobile VSAT terminals to form Ku band orthogonal beams (OB), or Ku OB beams, which feature guaranteed isolations and yet without the penalty of reduced efficiency of bandwidth utility.
 ii. Existing LP Ku space assets to service CP user via WF muxing/demuxing;
  1. eliminating the need for polarization re-alignments,
   a. lower the cost for the mobile VSAT terminals
  2. and enabling more resource sharing capabilities among multiple users
   a. more effectively use the allocated space assets

BRIEF DESCRIPTION OF THE DRAWINGS

FIG. 7a depicts another example of array antenna for a mobile terminal. It features 4 gimbal small reflectors in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
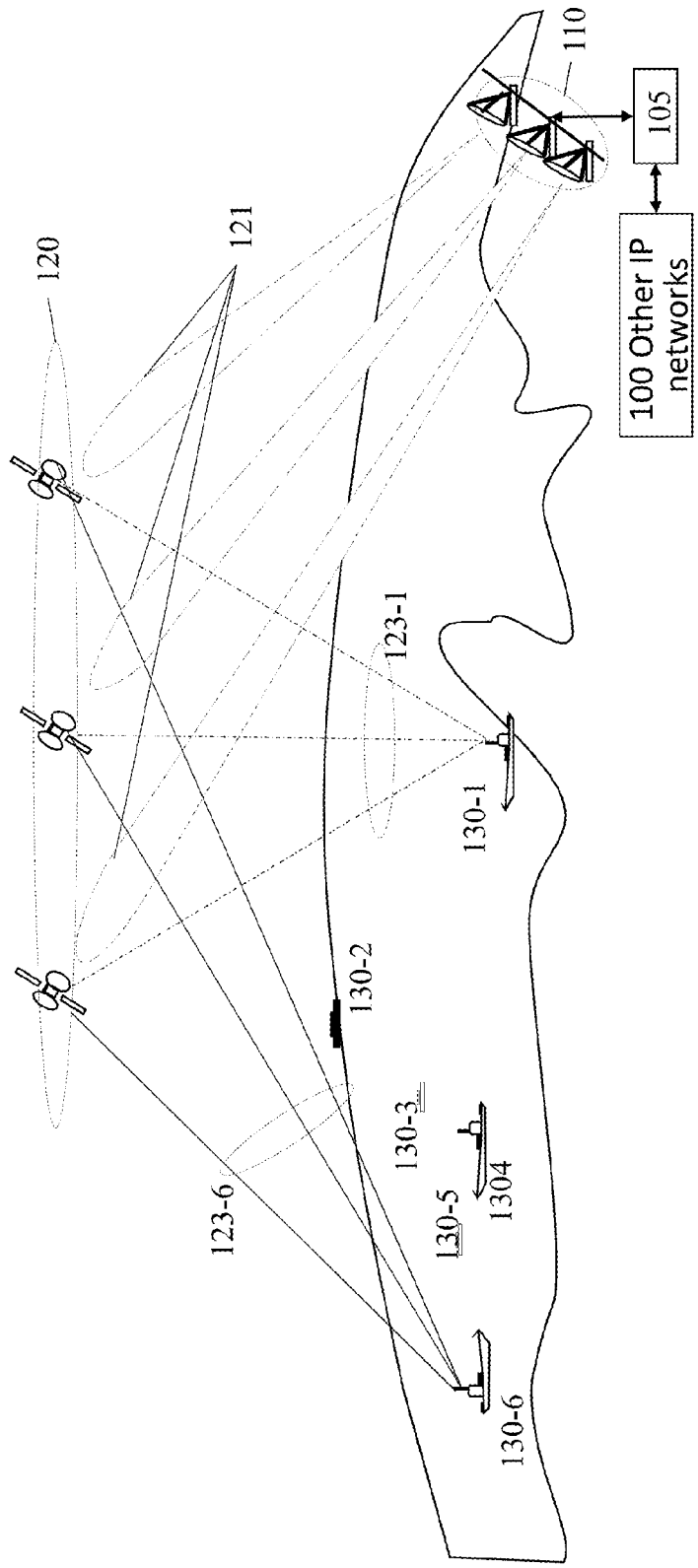
FIG. 1a illustrates a communication network configuration for ocean surface platforms, such as fishing boats, tankers, oil exploring/drilling platforms, or other commercial ships, to a land based ground gateways via multiple satellites concurrently in accordance with some embodiments.

FIG. 1a illustrates a SATCOM operational scenario for various fishing boats 130s. The multibeam Satcom antennas on the boats must provide adequate high gain links 123 toward different directions of various relay satellites 120s continuously, while the boats 130 s are on operation. The desired antenna may have multiple tracking beam capability following relay satellites 120s independently. There are three satellites, which are individually connected to a ground hub 110 via three independent antennas or a ground antenna with three tracking beams 121. The ground hub is connected to other ground IP infrastructures100 via a gateway 105. The architecture works for both forward links from a ground hub 110 via satellites 120 to fishing boats 130, and return links from fishing boats 130 via satellite 120 to a ground hub 110.

Figure 1B:
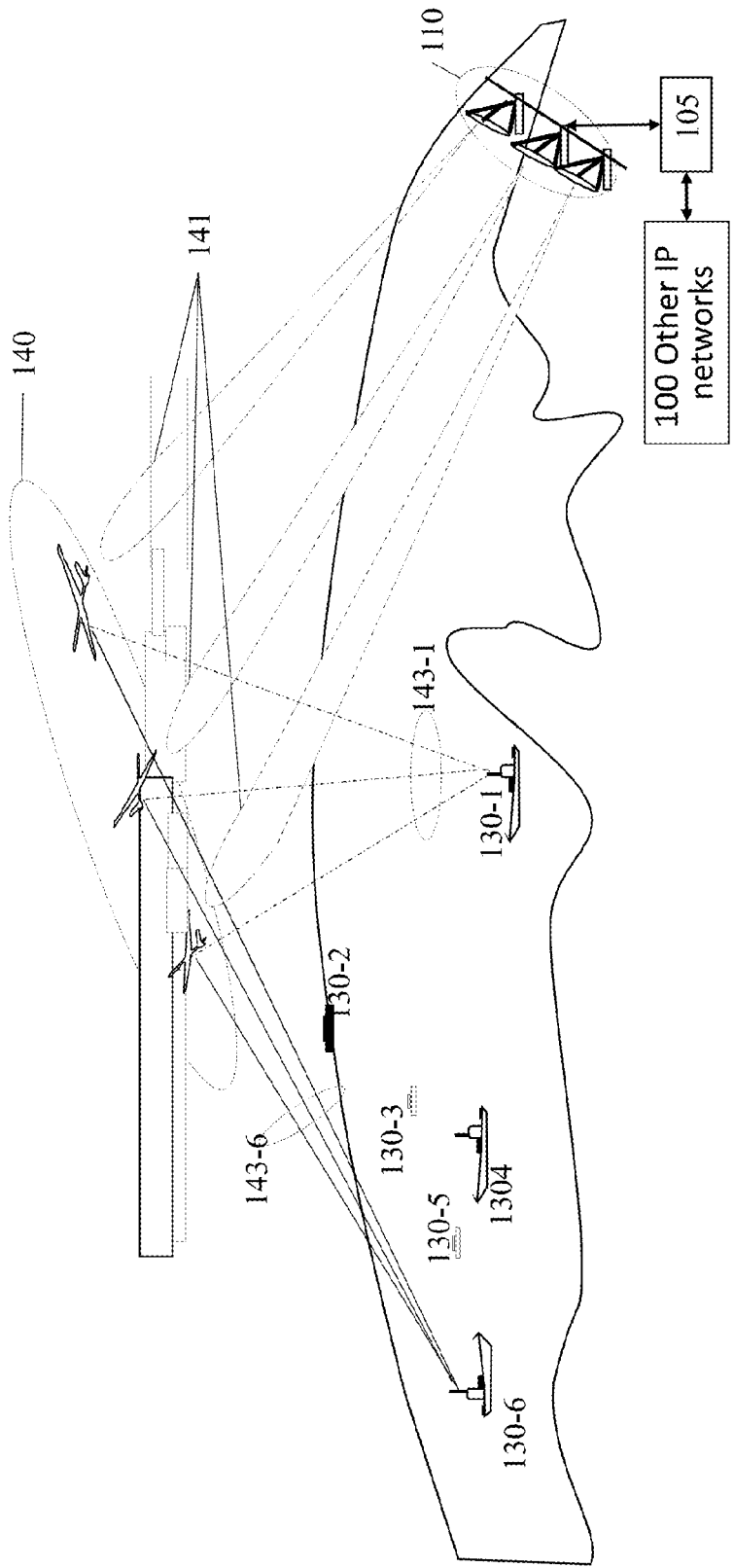
FIG. 1b illustrates a communication network configuration for ocean surface platforms, such as fishing boats, tankers, oil exploring/drilling platforms, or other commercial ships, to a land based ground gateways via multiple UAVs concurrently in accordance with some embodiments.

FIG. 1b illustrates an operational scenario via UAVs 140 for various fishing boats130s. The multibeam VSAT antennas on these boats must provide adequate high gain links 143 toward different directions of various relay UAVs 140s continuously, while the boats 130s are on operation. The desired antenna may have multiple tracking beam capability following relay UAVs 120s independently. There are three UAVs, which are individually connected to a ground hub 110 via three independent antennas or a ground antenna with three tracking beams 141. The ground hub is connected to other ground IP infrastructures 100 via a gateway105.

There are other operational scenarios (no shown) via UAVs 140 and satellites 120 for various fishing boats 130s. The multibeam VSAT antennas on these boats must provide adequate high gain links 143 toward different directions of various relay UAVs 140s and satellites 120 continuously, while the boats 130s are on operation. The desired antenna may have multiple tracking beam capability following relaying UAVs 140 and satellites 120s independently. There will be many UAVs 140s and satellites 120s, which are individually connected to a ground hub 110 via multiple independent antennas or a ground antenna with multiple tracking beams 141 and 121. The ground hub is connected to other ground IP infrastructures 100 via a gateway 105.

Figure 1C:
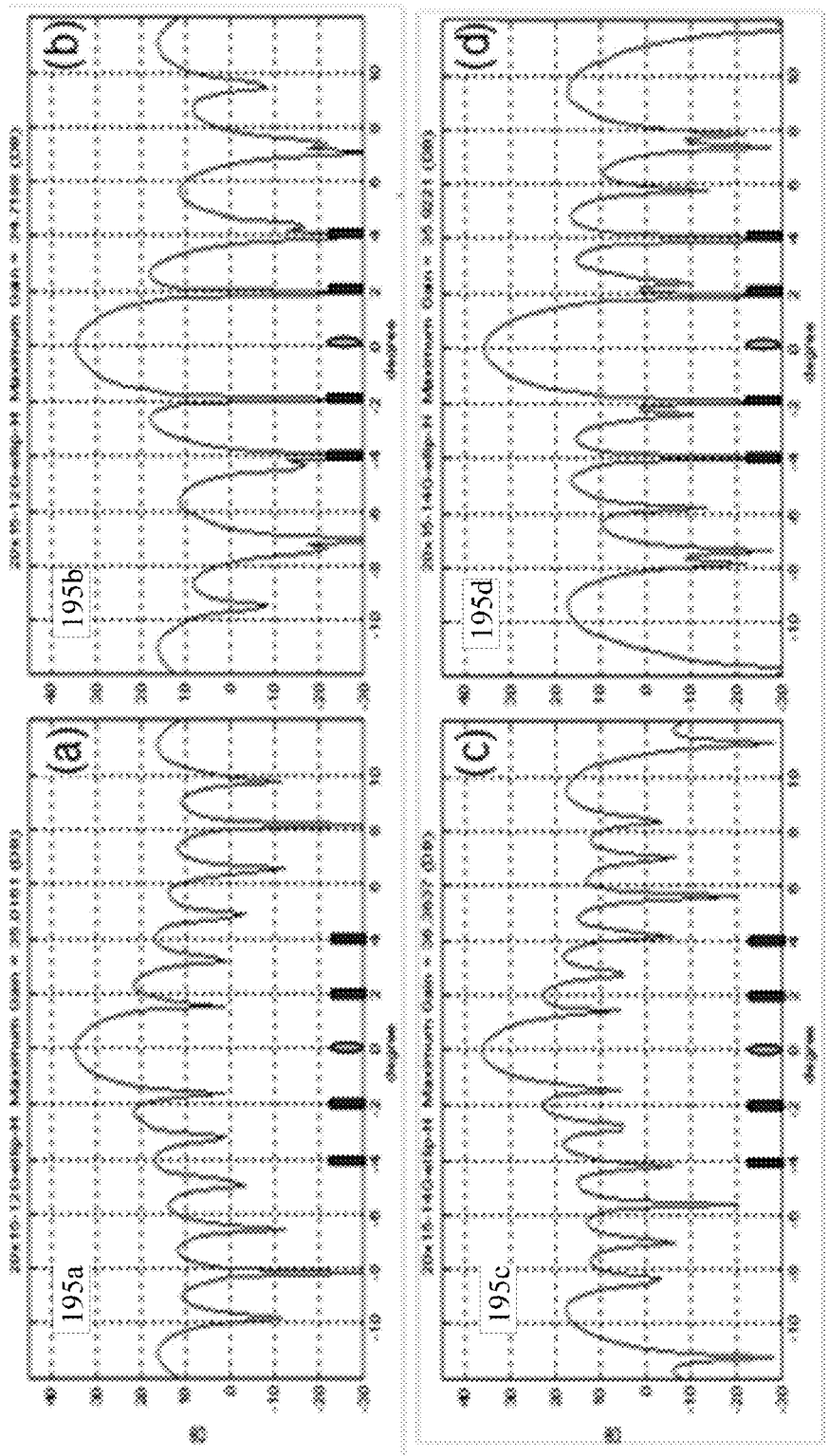
FIG. 1c illustrates examples of differences in radiation patterns from antennas of Ku band ground VSAT terminals for both transmit and receiving to those of orthogonal-beams (OB) by advanced Ku terminals in accordance with some embodiments.

FIG. 1c depicts one-dimensional radiation patterns of near boresight beams from a gimbal dish with a 5-element array feed; (a) a conventional receiving beam 195a at 12 GHz, (b) a receiving orthogonal beam 195b at 12 GHz with deep nulls at ±2° and ±4°, (c) a conventional transmitting beam 195c at 14 GHz, and (d) a transmitting orthogonal beam 195d at 14 GHz with deep nulls at ±2° and ±4°. Both OB beams 195b and 195d at shaped beams under five performance constraints. There are 5 individual Ku transponding satellites servicing a same coverage at the following directions along a geo-stationary orbital arc; (1) a boresight of the gimbal dish, or 0 degrees; (2) +2 degree away from the boresight; (3) +4 degrees away from the boresight; (4) −2 degree away from the boresight; and (5) −4 degrees away from the boresight.

Space Assets

There are many available space assets covering East and South coastal regions of Asia. Let us look at both C and Ku band coverage of satellites near 88° E.

Figure 2A:
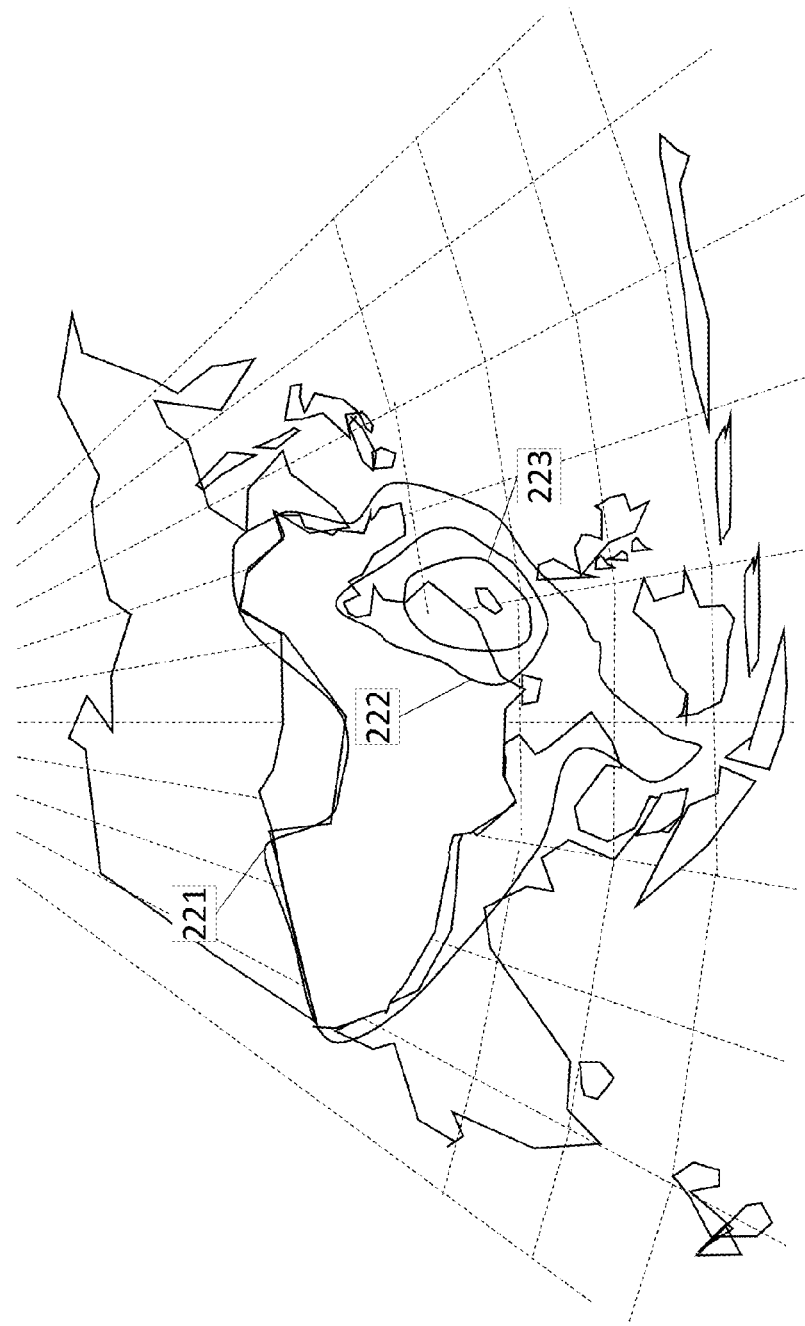
FIG. 2a depicts a Ku-band "representative" coverage of a transponding satellite near 88° E with EIRP contours in dBw. It was launched on late 1990s. Both C-band and Ku bands are still active in this old satellite, covering coastal regions of western Pacific Ocean.

FIG. 2a depicts a Ku-band coverage of a retired satellite near 88° E with "representative" EIRP contours in dBW. "Representative" contours are not real performance EIRP contours but representing of coverage regions with the radiated EIRP in the same order of magnitudes of real EIRP.

The retired satellite was launched on late 1990s. Both C- and Ku-band payloads are still active in this retired satellite. The innermost Ku EIRP contour 223 is 52 dBw, the second contour 222 at 50 dBw and the outer-most contour 221 at 45 dBW. It covers all Yellow sea, majority of Eastern China sea and South China Sea.

Its C-band coverage (not shown) features EIRP contours of 41 dBw over East Asia, Southeastern Asia, and Western Pacific Ocean. It covers Siberia, Northern Indian Ocean, and most of Middle East with >35 dBW. Almost all the Sea of Okhotsk, Sea of Japan, Yellow Sea, East China Sea, South China Sea, coastal region of South Asia, Arabian Sea, New Guinea, Indonesia, northern portion of Australia are under the coverage of the C-band beam.

Figure 2B:
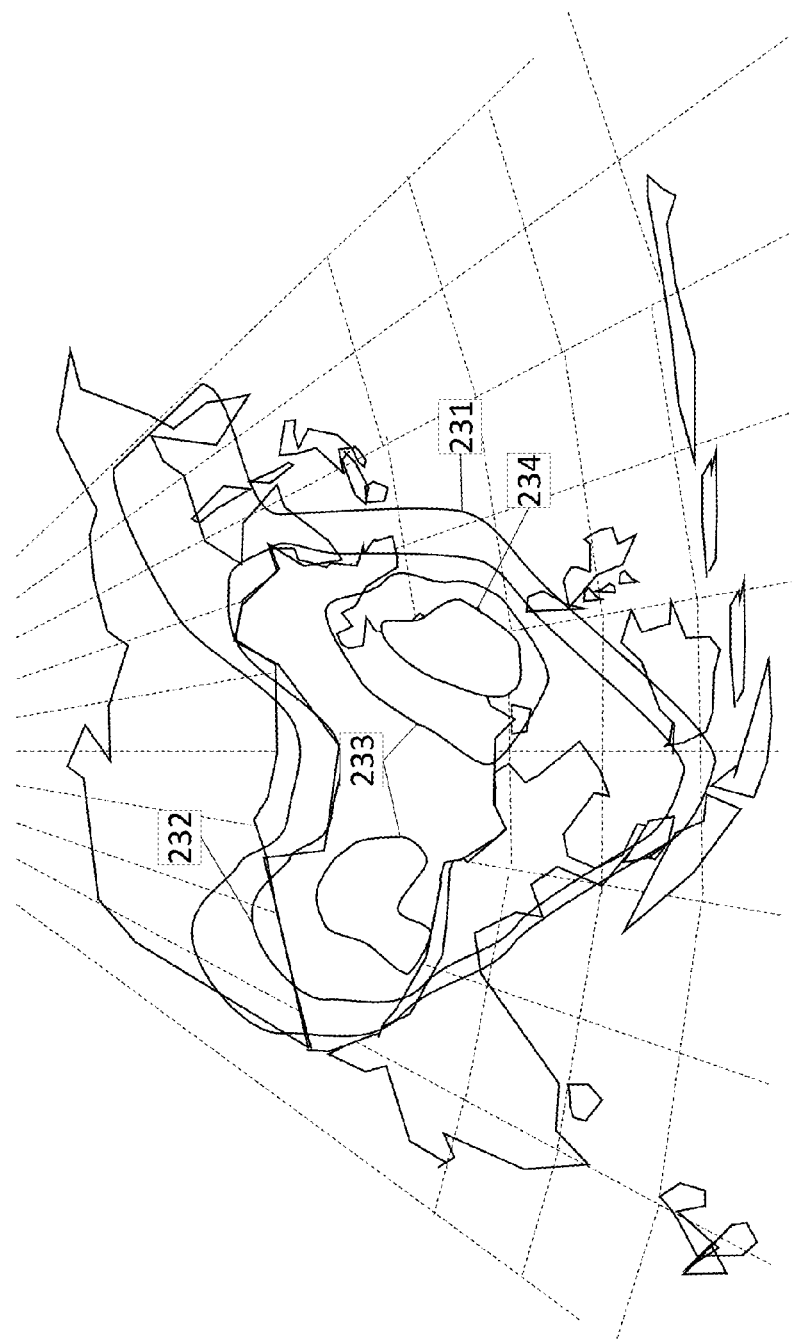
FIG. 2b depicts another Ku-band "representative" coverage of a transponding satellite near 88° E with EIRP contours in dBW. The satellite was launched on early 2010s. Both C-band and Ku bands are active, covering coastal regions of western Pacific Ocean.

FIG. 2b depicts another Ku-band coverage of a recently launched satellite near 88° E intended for the replacement of the Ku coverage in FIG. 2a of the old satellite. The newer satellite was launched on late 2012. It is parked in the same orbital slot as that of of the old satellite and comprises two Ku beams, and a C-band global beam, all in LP. The depicted represented EIRP contours feature 50, 48, 46 and 44 dBW coverage, from the innermost 234 to the outer-most 231.

Figure 2C:
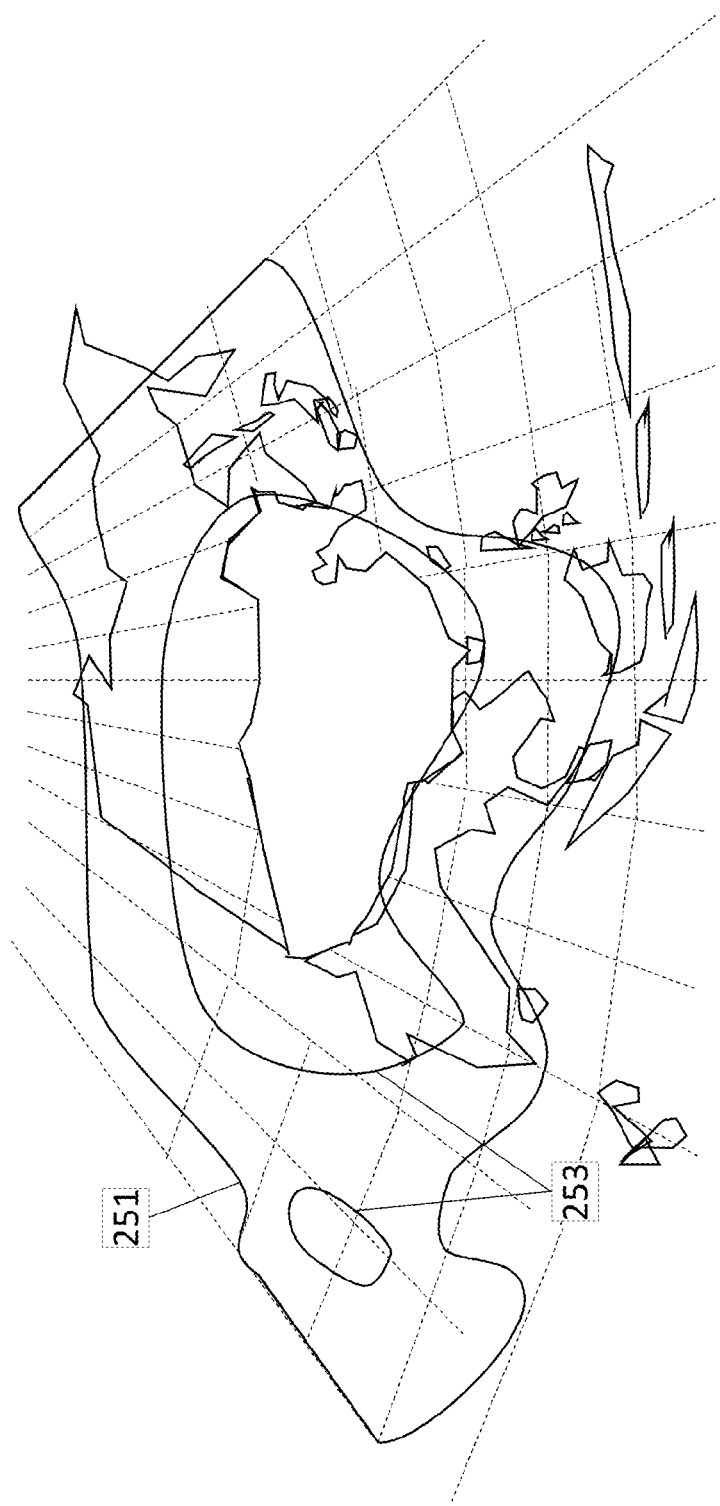
FIG. 2c depicts a C-band "representative" coverage of a transponding satellite near 88° E with EIRP contours in dBw. It was launched on early 2010s. The C band global beam EIRP contours covers almost all coastal regions of Asia and East Africa.

The representative EIRP contours of the C band global beam from the newer satellite depicted in FIG. 2c feature 39, and 36 dBw coverage, from the innermost 253 to the outer-most 251. It covers almost all coastal regions of Asia and some of East Africa.

Minimized SWaP consumptions are very important design features for the Satcom array antennas on fishing boats. Furthermore, the C or Ku antenna must be designed for easy integration, including testing and calibrations, on to different versions of fishing boats. Costs of equipment and accessible space assets are key drivers for this satellite service.

Figure 3A:
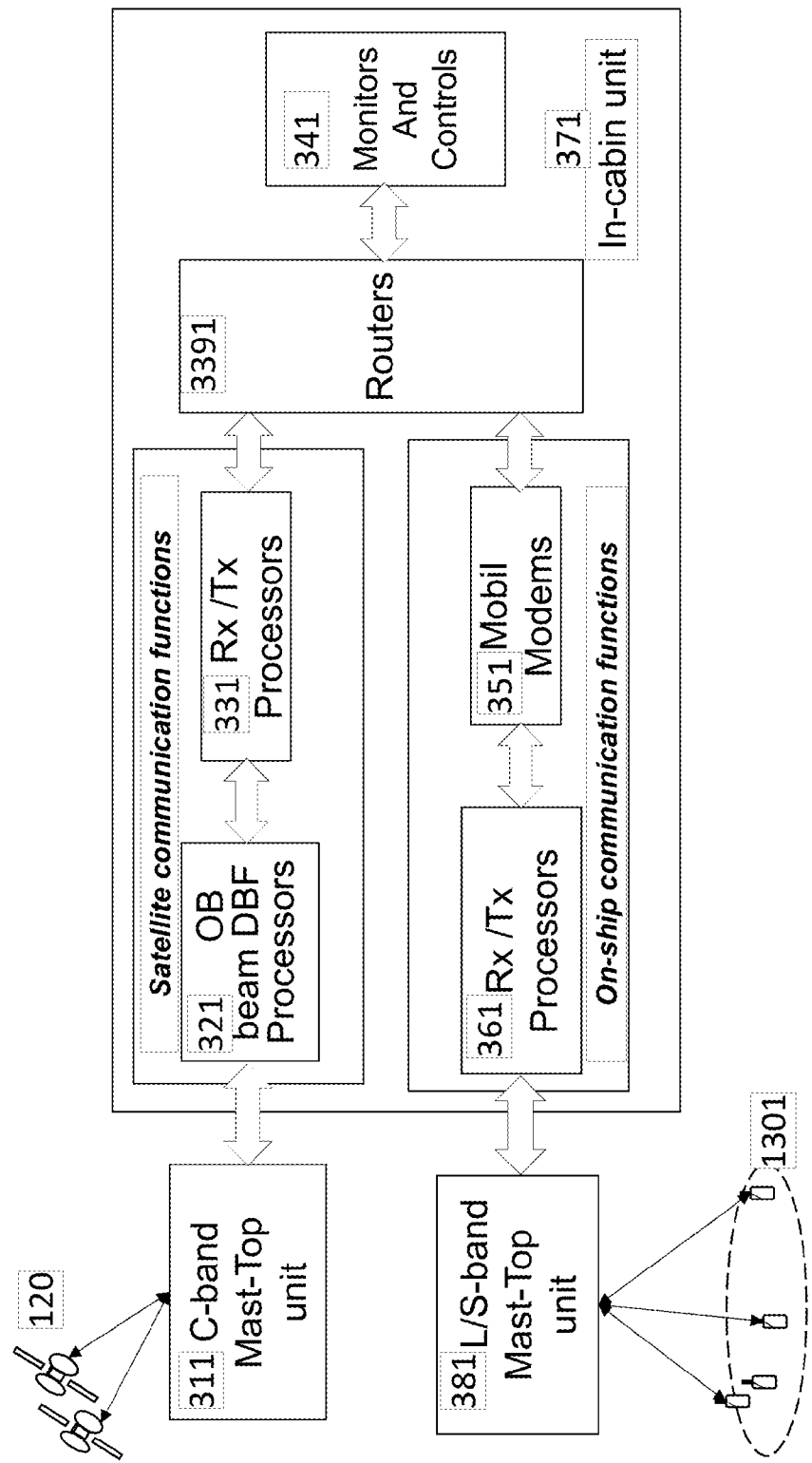
FIG. 3a depicts a functional block diagram of a mobile VSAT terminal on an ocean surface vessel via C-band transponding satellites. Mobile users on board the vessel are connected to the rest of the world by the C-band satellites and via their own personal communications devices.

FIG. 3a depicts one such a mobile terminal at C-band. There are three parts of a terminal, two mast top units 311 and 381, and an in-cabin unit. The C-band mast top unit 311 comprises of transmitting and receiving antennas and RF frontends aiming toward multiple C-band satellites 120. The L/S band mast-top unit 381 shall function as mini or small base stations for connecting portable and fixed devices 1301 which may include PC, notebook, cellphones, smart phones and others. This unit 381 may use commercial cell bands, and/or wifi bands to communicate with the user devices 1301.

The in-cabin unit 371, interconnecting satellite communications functions with the on-ship communication functions, comprise of 6 functional blocks; a DBF processor block 321, a block for Satcom receiving/transmitting processors 331, a router block 3391, a mobile modem block 351, a block for mobile receiving/transmitting processor 361 and a block for monitoring and controlling 341.

The DBF processors 321 performs beam forming for multiple tracking beams concurrently for both transmit and receiving functions. The beam forming capability shall feature the ones for multiple shaped beams concurrently, including the one for concurrent OB beams. OB beams are for minimizing mutual interferences among concurrent multiple beams at a common frequency slot.

The Satcom Rx/Tx processors 331 perform many communications functions such as frequency tracking, time synchronization, channelization, modulation and demodulations. In many embodiments, it may also perform wavefront multiplexing (WF muxing) and wavefront de-multiplexing (WF demuxing) transformations The Routers 3391 performs routine functions package by packages (1) from various Satcom links to different WLAN terminals and (2) from various WLAN terminals to different Satcom links The mobile modems 351 perform both modulation, and demodulation for an on-ship communications converting data to signal waveforms targeting for user equipment 1301, and de-modulating the received signal waveforms to a data stream aiming for Satcom connectivity.

The local network Rx/Tx processors 361 performs functions other than modulation and demodulations; such as timing synchronization, channelization, carrier tracking and many others As a result, a wife of a crew member on a fishing boat may send a stream of real-time video or a set of pictures on their son's graduation ceremony through this service under a low and affordable cost, when the fish boat is a few thousand miles away from their home.

Figure 3B:
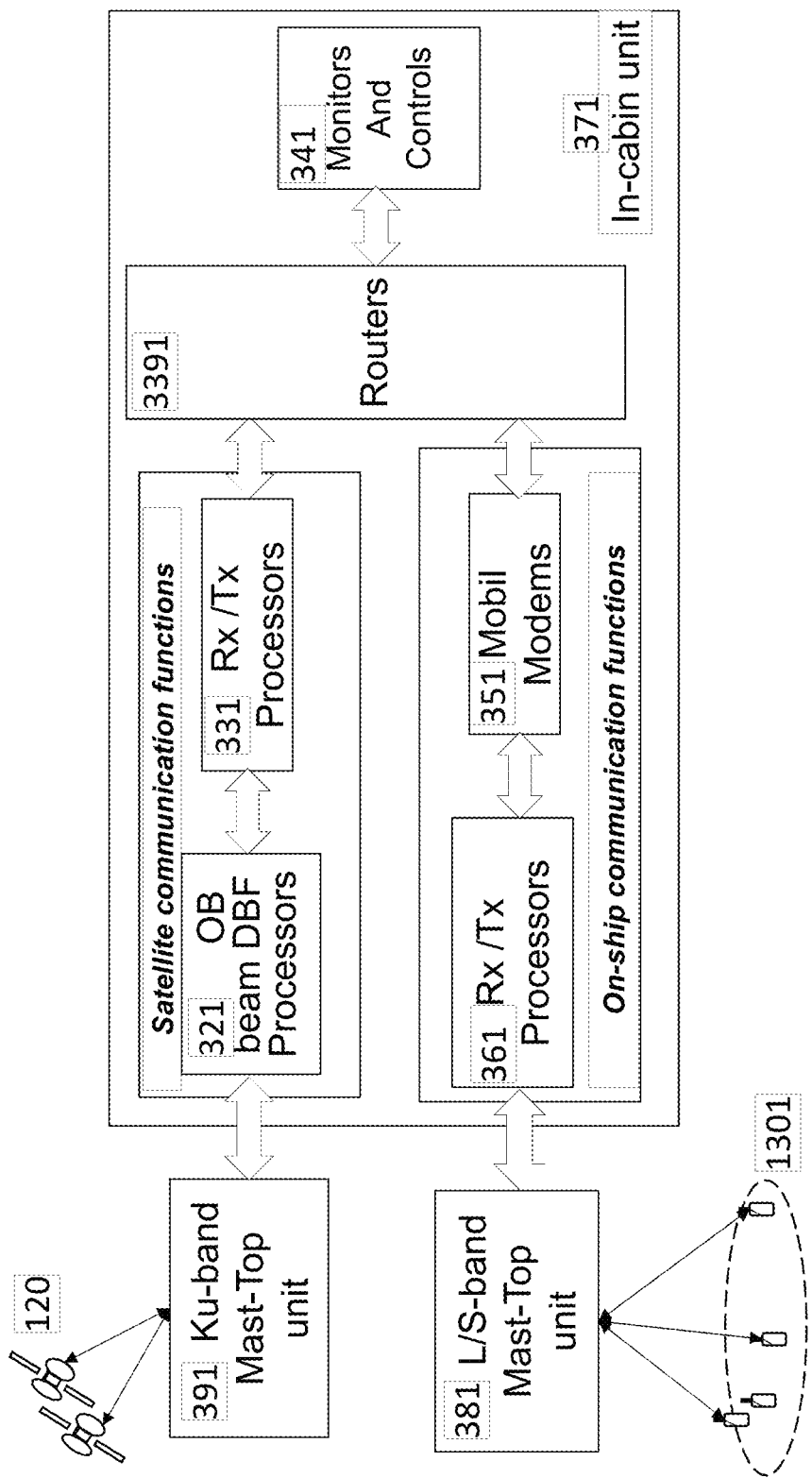
FIG. 3b depicts a functional block diagram of a mobile VSAT terminal on an ocean surface vessel via Ku-band transponding satellites. Mobile users on board the vessel are connected to the rest of the world by the Ku-band satellites and via their own personal communications devices.

FIG. 3b depicts one such a mobile terminal at Ku-band. There are three parts of a terminal, two mast top units 391 and 381, and an in-cabin unit. The Ku-band mast top unit 391 comprises of transmitting and receiving antennas and RF frontends aiming toward multiple Ku-band satellites 120. The L/S band mast-top unit 381 shall function as mini or small base stations for connecting portable and fixed devices 1301 which may include PC, notebook, cellphones, smart phones and others. This unit 381 may use commercial cell bands, and/or wifi bands to communicate with the user devices 1301.

The in-cabin unit 371, interconnecting satellite communications functions with the on-ship communication functions, comprise of 6 functional blocks; a DBF processor block 321, a block for Satcom receiving/transmitting processors 331, a router block 3391, a mobile modem block 351, a block for mobile receiving/transmitting processor 361 and a block for monitoring and controlling 341. It is identical to the one in FIG. 3a.

The DBF processors 321 performs beam forming for multiple tracking beams concurrently for both transmit and receiving functions. The beam forming capability for Ku-band beams shall feature the ones for multiple shaped beams concurrently, including the one for concurrent OB beams.

OB beams are for minimizing mutual interferences among concurrent multiple beams at a common frequency slot.

In other embodiments to communicate with C- and Ku band satellites concurrently, a mobile terminal may comprise of a Satcom Mast-top unit (not shown) with functions of both a C-band unit 311 and a Ku band unit 391 aiming for various transponders of different satellites at C and/or Ku-bands. The mast top unit comprises of transmitting and receiving antennas and RF frontends aiming toward multiple C- and/or Ku-band satellites 120. The L/S band mast-top unit 381 shall function as mini or small base stations for connecting portable and fixed devices 1301 which may include PC, notebook, cellphones, smart phones and others. This unit 381 may use commercial cell bands, and/or wifi bands to communicate with the user devices 1301.

The in-cabin unit 371, interconnecting satellite communications functions with the on-ship communication functions, comprise of 6 functional blocks; a DBF processor block 321, a block for Satcom receiving/transmitting processors 331, a router block 3391, a mobile modem block 351, a block for mobile receiving/transmitting processor 361 and a block for monitoring and controlling 341. It is identical to the one in FIG. 3a.

The DBF processors 321 performs beam forming for multiple tracking beams concurrently for both transmit and receiving functions. The beam forming capability for both C-band and Ku-band beams shall feature the ones for multiple shaped beams concurrently, including the one for concurrent OB beams. OB beams are for minimizing mutual interferences among concurrent multiple beams at a common frequency slot.

Figure 3C:
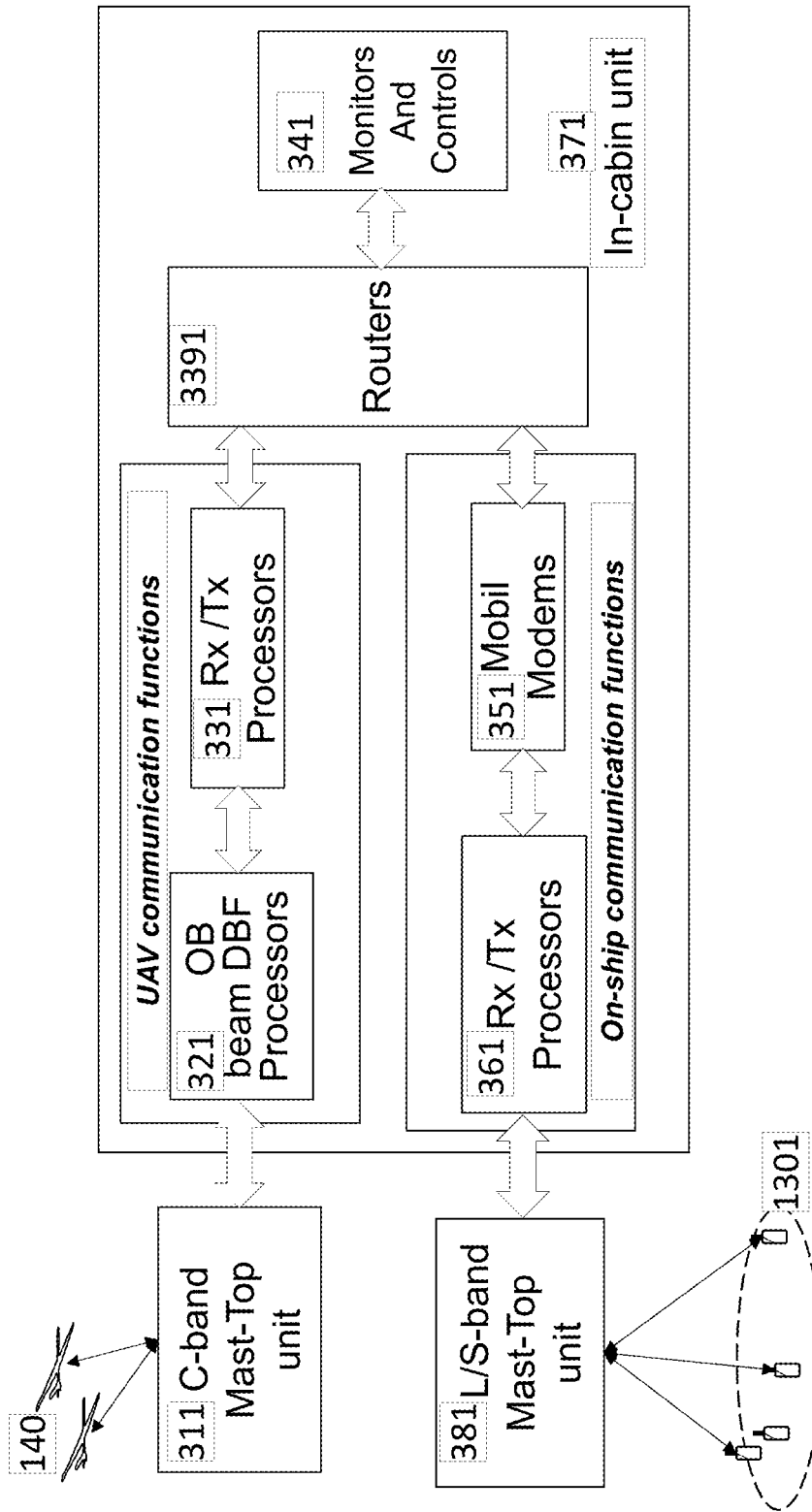
FIG. 3c depicts a functional block diagram of a mobile VSAT terminal on an ocean surface vessel via C-band transponding payloads of UAVs. Mobile users on board the vessel are connected to the rest of the world by the C-band relaying UAVs and via their own personal communications devices.

FIG. 3c depicts a mobile terminal at C-band aiming for multiple UAVs. There are three parts of a terminal, two mast top units 311 and 381, and an in-cabin unit. The C-band mast top unit 311 comprises of transmitting and receiving antennas and RF frontends aiming toward multiple C-band UAVs 140. The L/S band mast-top unit 381 shall function as mini or small base stations for connecting portable and fixed devices 1301 which may include PC, notebook, cellphones, smart phones and others. This unit 381 may use commercial cell bands, and/or wifi bands to communicate with the user devices 1301.

The in-cabin unit 371, interconnecting satellite communications functions with the on-ship communication functions, comprise of 6 functional blocks; a DBF processor block 321, a block for Satcom receiving/transmitting processors 331, a router block 3391, a mobile modem block 351, a block for mobile receiving/transmitting processor 361 and a block for monitoring and controlling 341.

The DBF processors 321 performs beam forming for multiple tracking beams concurrently for both transmit and receiving functions. The beam forming capability shall feature the ones for multiple shaped beams concurrently, including the one for concurrent OB beams. OB beams are for minimizing mutual interferences among concurrent multiple beams at a common frequency slot.

Figure 3D:
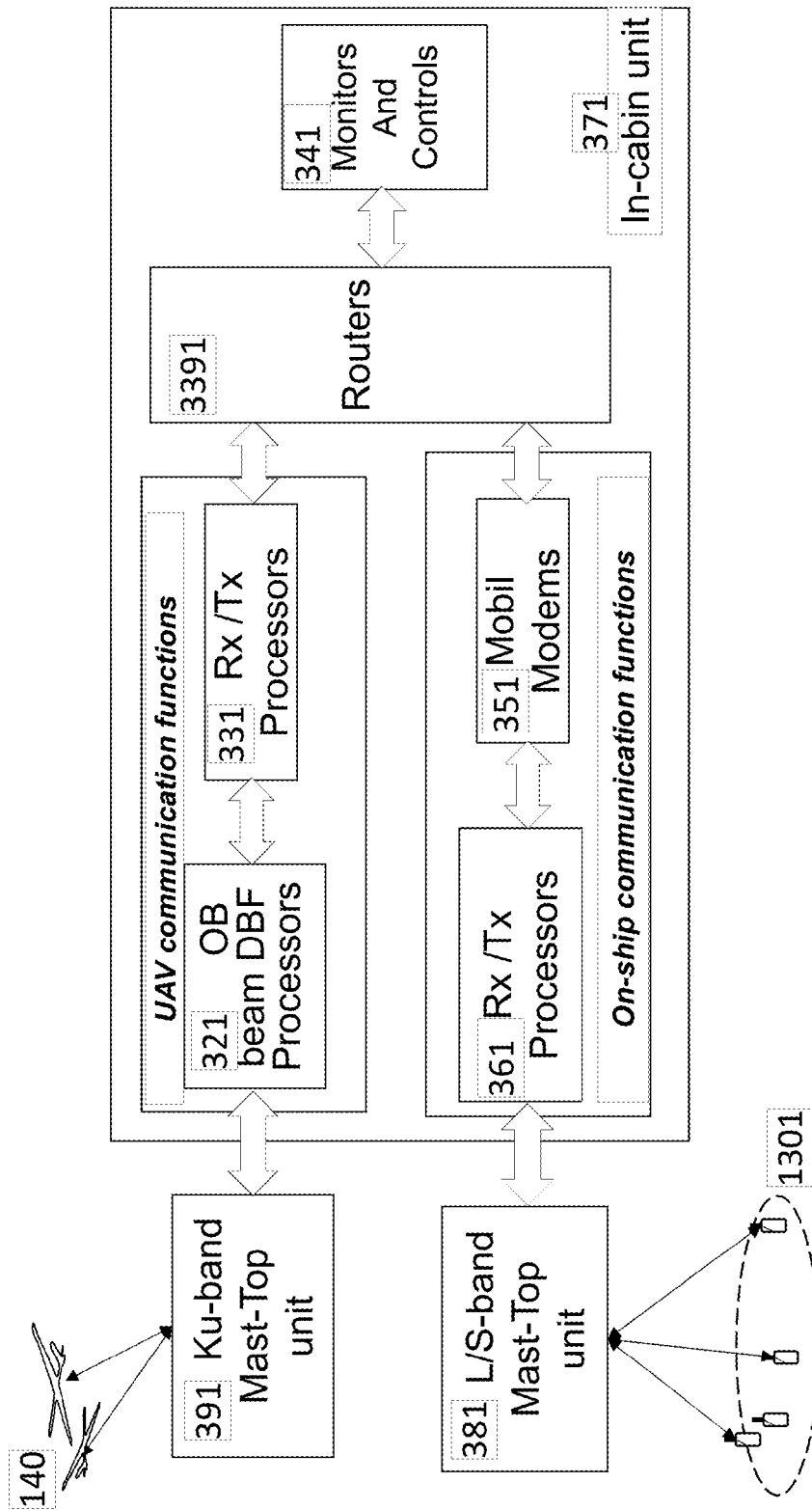
FIG. 3d depicts a functional block diagram of a mobile VSAT terminal on an ocean surface vessel via Ku-band transponding payloads of UAVs. Mobile users on board the vessel are connected to the rest of the world by the Ku-band relaying UAVs and via their own personal communications devices.

FIG. 3d depicts a mobile terminal at Ku-band aiming for multiple UAVs. There are three parts of a terminal, two mast top units 391 and 381, and an in-cabin unit. The Ku-band mast top unit 391 comprises of transmitting and receiving antennas and RF frontends aiming toward multiple Ku-band UAVs 140. The L/S band mast-top unit 381 shall function as mini or small base stations for connecting portable and fixed devices 1301 which may include PC, notebook, cellphones, smart phones and others. This unit 381 may use commercial cell bands, and/or wifi bands to communicate with the user devices 1301.

The in-cabin unit 371, interconnecting satellite communications functions with the on-ship communication functions, comprise of 6 functional blocks; a DBF processor block 321, a block for Satcom receiving/transmitting processors 331, a router block 3391, a mobile modem block 351, a block for mobile receiving/transmitting processor 361 and a block for monitoring and controlling 341.

The DBF processors 321 performs beam forming for multiple tracking beams concurrently for both transmit and receiving functions. The beam forming capability shall feature the ones for multiple shaped beams concurrently, including the one for concurrent OB beams. OB beams are for minimizing mutual interferences among concurrent multiple beams at a common frequency slot.

In other embodiments to communicate with C- and Ku band UAVs concurrently, a mobile terminal may comprise of a Satcom Mast-top unit (not shown) with functions of both a C-band unit 311 and a Ku band unit 391 aiming for various transponding UAVs 140 at C and/or Ku-bands. The mast top unit comprises of transmitting and receiving antennas and RF frontends aiming toward multiple C- and/or Ku-band UAVs 140. The L/S band mast-top unit 381 shall function as mini or small base stations for connecting portable and fixed devices 1301 which may include PC, notebook, cellphones, smart phones and others. This unit 381 may use commercial cell bands, and/or wifi bands to communicate with the user devices 1301.

The in-cabin unit 371, interconnecting satellite communications functions with the on-ship communication functions, comprise of 6 functional blocks; a DBF processor block 321, a block for UAV-based receiving/transmitting processors 331, a router block 3391, a mobile modem block 351, a block for mobile receiving/transmitting processor 361 and a block for monitoring and controlling 341. It is identical to the one in FIG. 3a.

The DBF processors 321 performs beam forming for multiple tracking beams concurrently for both transmit and receiving functions. The beam forming capability for both C-band and Ku-band beams shall feature the ones for multiple shaped beams concurrently, including the one for concurrent OB beams. OB beams are for minimizing mutual interferences among concurrent multiple beams at a common frequency slot.

In another set of embodiments to communicate with both satellites and UAVs concurrently at C- and Ku bands, a mobile terminal may comprise of a com mast-top unit (not shown) with functions of both a C-band unit 311 and a Ku band unit 391 aiming for various transponding UAVs 140 and/or satellites 120 at C and/or Ku-bands. The mast top unit comprises of transmitting and receiving antennas and RF frontends aiming toward multiple C- and/or Ku-band satellites 120 and/or UAVs 140. The L/S band mast-top unit 381 shall function as mini or small base stations for connecting portable and fixed devices 1301 which may include PC, notebook, cellphones, smart phones and others. This unit 381 may use commercial cell bands, and/or wifi bands to communicate with the user devices 1301.

The in-cabin unit 371, interconnecting satellite communications functions with the on-ship communication functions, comprise of 6 functional blocks; a DBF processor block 321, a block for UAV-based receiving/transmitting processors 331, a router block 3391, a mobile modem block 351, a block for mobile receiving/transmitting processor 361 and a block for monitoring and controlling 341. It is identical to the one in FIG. 3a.

A Nearly Conformed and Distributed Aperture

Figure 4A:
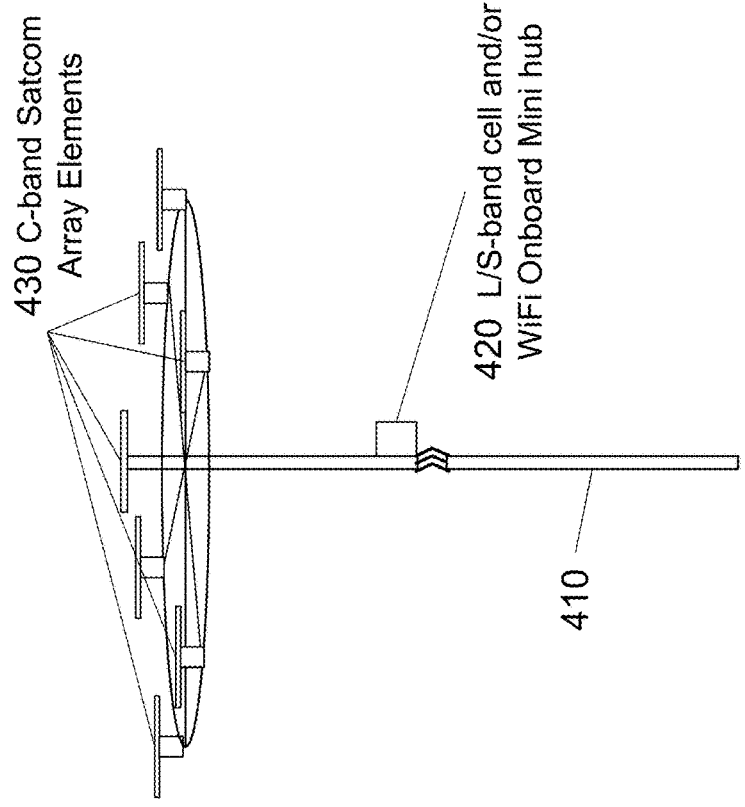
FIG. 4a depicts an example of a distributed array antenna with 7 C-band elements and an L/S band mini hub on a ship mast in accordance with some embodiments.

A distributed array with multiple elements 430 in C-band for a fishing boat depicted in FIG. 4a are mounted on a mast

410. In this figure, there are 7 C-band elements, as an example, distributed on the circumference of a 3-meter circular ring. Each element is associated with power amplifiers (PAs) for transmission and low-noise-amplifiers (LNAs) for receptions of dual polarization signals. In reception, the captured signals by individual elements are conditioned (low noise amplified and filtered) before frequency down converted and digitized. The digitized signals are sent for further processing in an in-cabin unit 371 in which a DBF processor 321 will perform beam-forming calculation for multiple concurrent OB beams individually focusing the received signals toward different directions of various C-band satellites. An OB beam features a peak on a targeted desired satellite direction and nulls to directions of undesired satellites which shall be the pointing directions of peaks of other OB beams.

An L/S band mini hub 420 on the mast is also depicted and is for communications links to and from mobile users 1301 on a fishing boat 130.

Figure 4B:
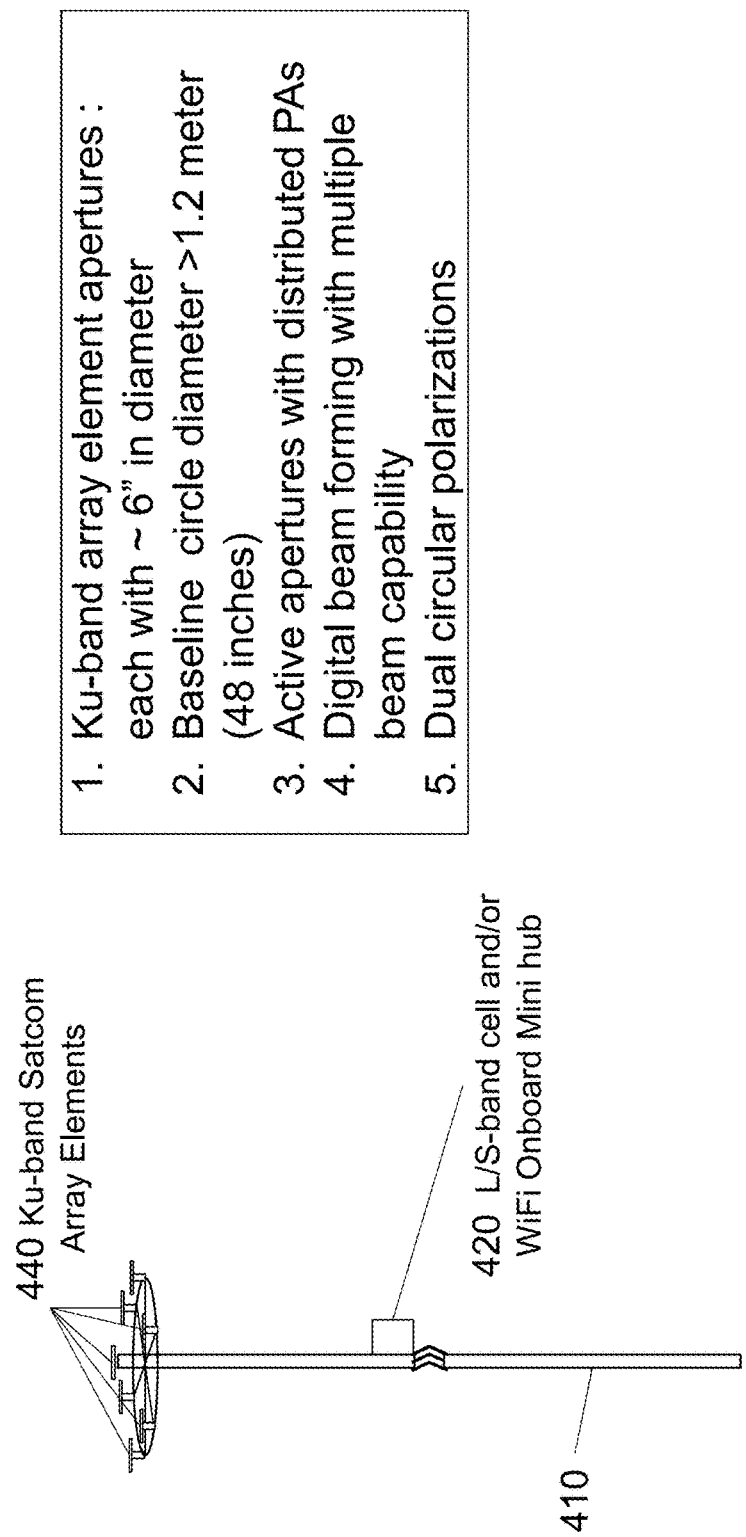
FIG. 4b depicts an example of a distributed array antenna with 7 Ku-band elements and an L/S band mini hub on a ship mast in accordance with some embodiments.

In other embodiments with features of OB beams, the C-band elements for small boats may be distributed over an area with less than 2 meter in diameter without compromising interference rejection capabilities in the directions of adjacent C-band satellites but with penalty of reduced peak gain in the desired beam direction FIG. 4b depicts a distributed Ku array with multiple elements 440, similar to the C band design depicted in FIG. 4a. The exemplified array features 7 distributed gimbaled elements or subarrays; each with a 6" aperture area to form multiple OB beams. For the 7 element Ku-band distributed array with full capability of forming OB beams with a minimum null-to-peak angular distance of 2 degrees, these elements may only be distributed over a required area with less than 1 meter in diameter without compromising interference rejection capabilities in the directions of adjacent Ku satellites and without penalty of reduced peak gain in the desired beam direction.

Figure 4C:
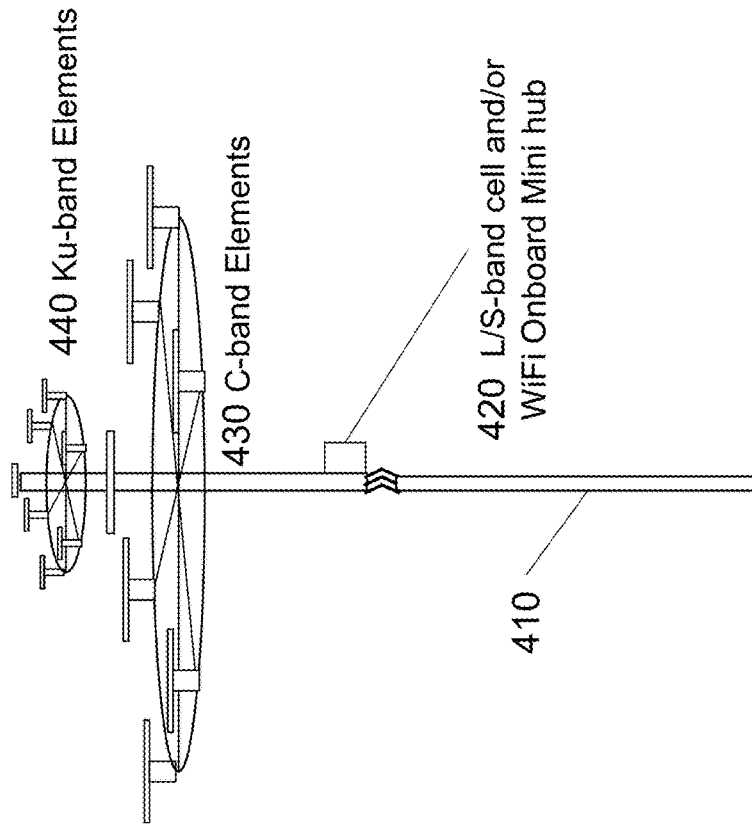
FIG. 4c depicts an example of a distributed array antenna with 7 C-band elements and 7 Ku-band elements on a ship mast in accordance with some embodiments.

FIG. 4c depicts a distributed array with multiple Ku elements 440 and C band elements 430 on a mast 410, similar to the C-band design depicted in FIG. 4a and the Ku band design in FIG. 4b. There is a L/S band min-hub anchored on the same mast 410. The exemplified array features two sets of 7 distributed gimbaled elements or subarrays; one for C-band and one for Ku band. Each of the elements for Ku band array features a 6" aperture area to form multiple OB beams. The distributed array is with full capability of forming OB beams with a minimum null-to-peak angular distance of 2 degrees, these elements may only be distributed over a required area with less than 1 meter in diameter without compromising interference rejection capabilities in the directions of adjacent Ku satellites and without penalty of reduced peak gain in the desired beam direction.

In many other embodiments on the other hand, the array elements 430 and 440 of distributed arrays could be nearly conformed to a boat profile in the final integration process while the elements or subarrays might have been designed to be planner. The array antennas would consist of multiple smaller apertures distributed on the topside of a fishing boat operating coherently. Subarray modules will be fitted onto these small surface areas individually, and mechanically mounted independently. They may not be on a plane. Consequently, their field of views (FOV's) may become significantly different providing the key functions of dynamic selection of FOVs, enhancing system operability with dramatically improved configurability and survivability.

Figure 5A:
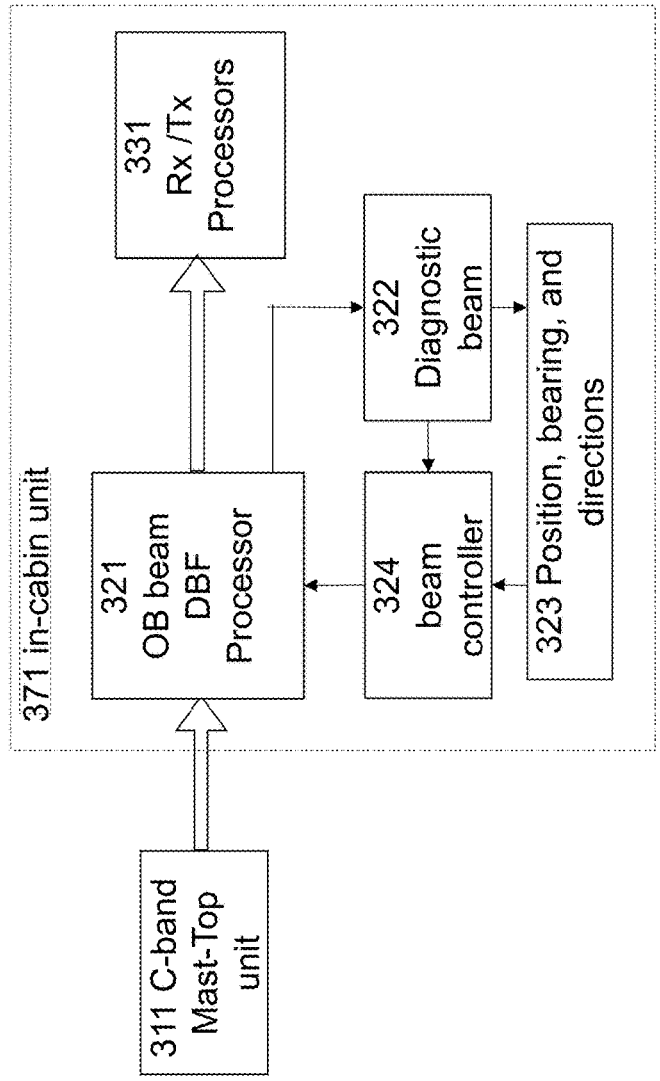
FIG. 5a depicts an example of a C-band array antenna with digital beam forming (DBF) processor to form multiple orthogonal beams (OB) dynamically tracking multiple satellites concurrently with minimized mutual interferences in accordance with some embodiments. Each dynamic OB beam features a smart tracking loop via auxiliary diagnostic beams.

A smart C band antenna depicted on FIG. 5a comprises three building blocks; a C band mast-top unit 311, a DBF processor 321, and a unit of Rx/Tx Processors 331. It is organized by properly interconnecting these three major functional boxes as depicted. The DBF 321 is capable of forming multiple simultaneous bam very cost effectively. Some 322 are used for diagnostic; probing know directions of multiple satellites to calculate orientations and relative velocities 323 of the anchoring fishing boat. This information along with the boat current position are passed to a beam controller 324 to calculate the new constraints for a set of updating OB beams in C band.

Figure 5B:
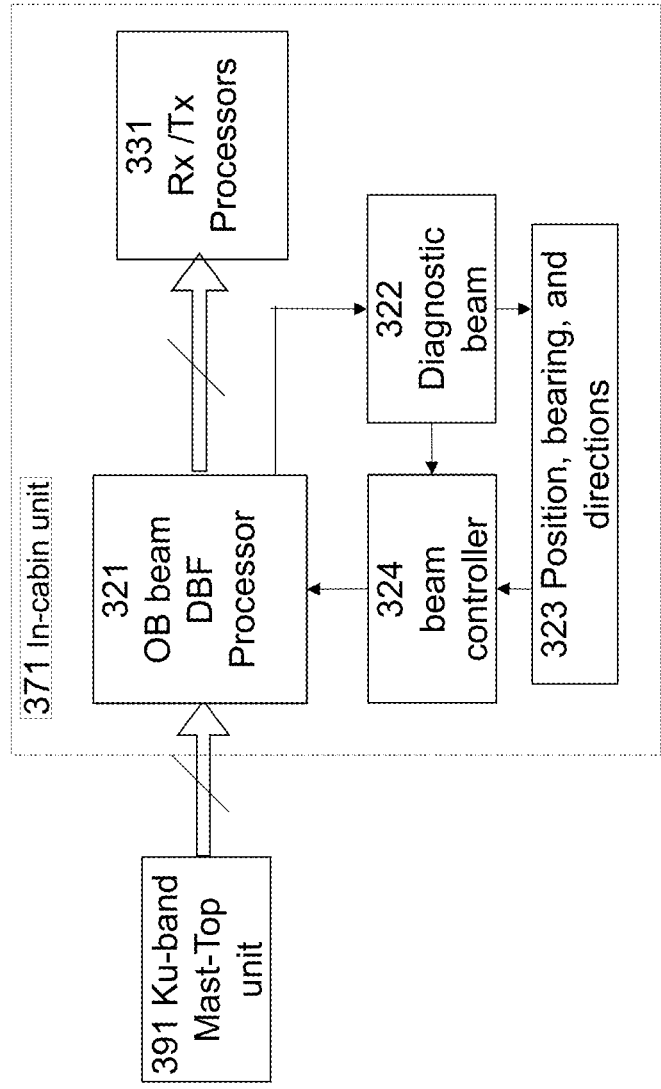
FIG. 5b depicts an example of a Ku-band array antenna with digital beam forming (DBF) processor to form multiple orthogonal beams (OB) dynamically tracking multiple satellites concurrently with minimized mutual interferences in accordance with some embodiments. Each dynamic OB beam features a smart tracking loop via auxiliary diagnostic beams.

A smart Ku band antenna depicted on FIG. 5b comprises of three building blocks; a Ku band mast-top unit 391, a DBF processor 321, and a unit of Rx/Tx Processors 331. It is organized by properly interconnecting these three major functional boxes as depicted. The DBF 321 is capable of forming multiple simultaneous bam very cost effectively. Some 322 are used for diagnostic; probing know directions of multiple satellites to calculate orientations and relative velocities 323 of the anchoring fishing boat. This information along with the boat current position are passed to a beam controller 324 to calculate the new constraints for a set of updating OB beams in Ku band.

Wavefront Multiplexing/De-Multiplexing (WF Muxing/Demuxing)

Figure 5C:
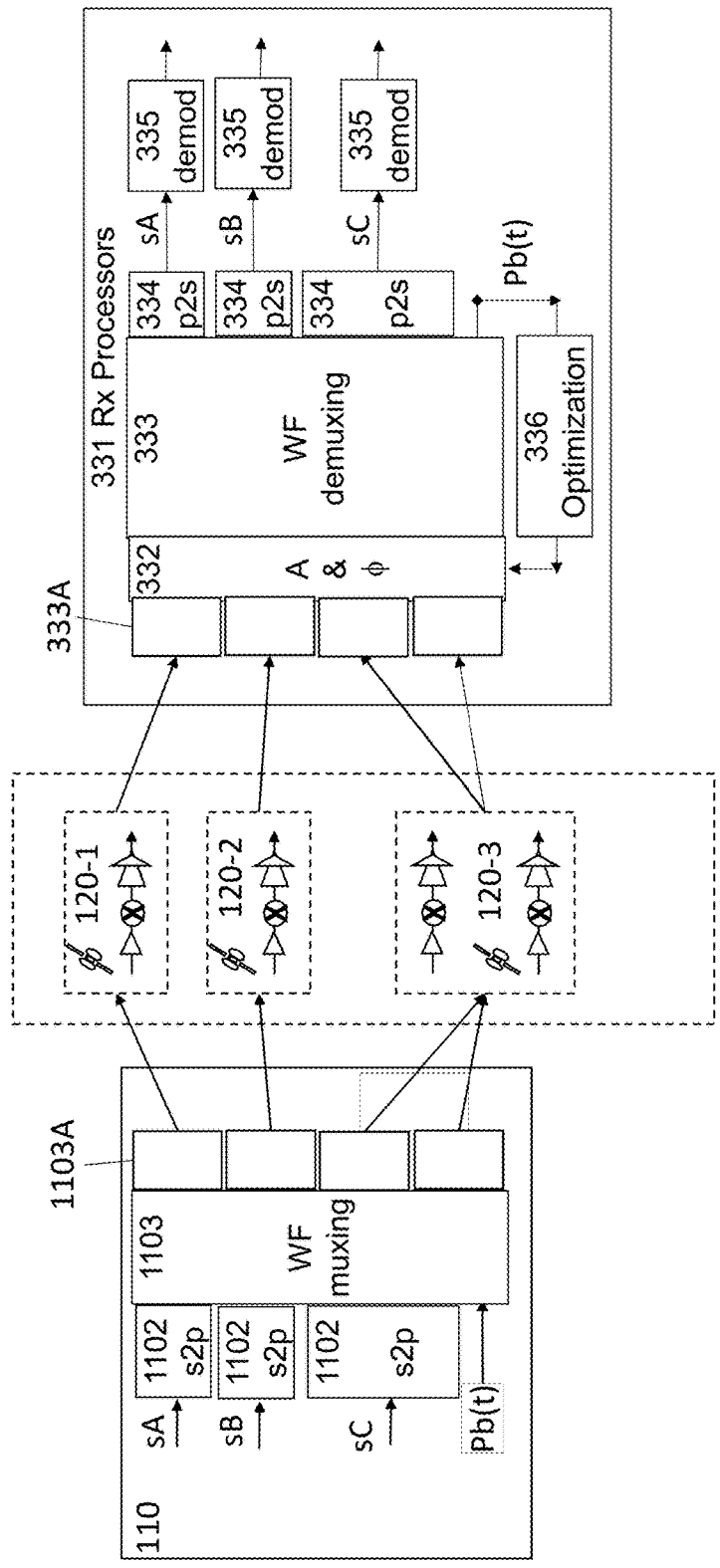
FIG. 5c depicts an example of a wavefront multiplexing/de-multiplexing (WF muxing/demuxing) processor via multiple satellites for transporting three independent data streams to a fishing in accordance with some embodiments.

In other embodiments, WF muxing and WF demuxing are incorporated in satellite communication architectures to dynamically share resources of space assets as depicted in FIG. 5c as an exemplified configuration for mobile VSAT for fishing boats in a forward link, such as depicted in FIG. 1 from a ground hub 110 to a fishing boat 130-6. The return links (not shown) are similar with WF muxing in transmitting fishing boats 130 and WF demuxing in receiving ground hub 110. The mathematic details on WF muxing/demuxing have been presented in many publications. We are citing two recently published US patents; U.S. Pat. No. 8,535,326 B2 on Sep. 17, 2013 titled "Accessing LP transponders with CP terminals via wavefront multiplexing techniques," and U.S. Pat. No. 8,547,897 B2 on Oct. 1, 2013 titled "Coherent power combining for signals through multiple satellite communications channels."

Figure 5D:
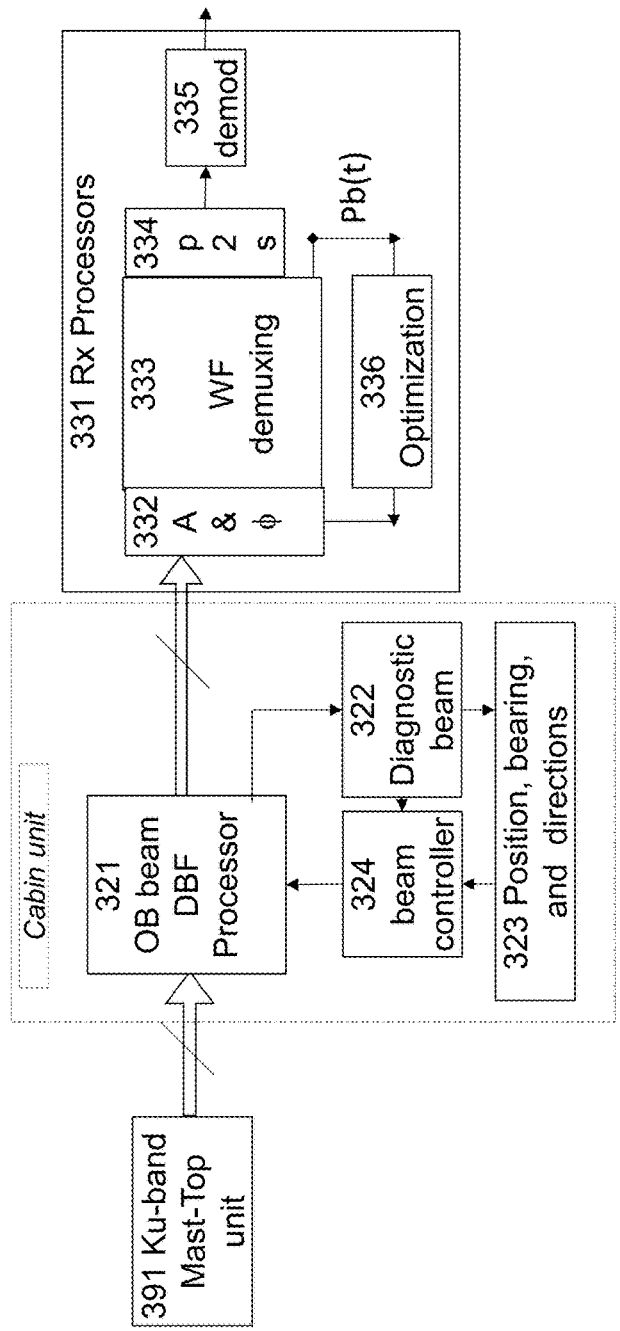
FIG. 5d depicts an example of a wavefront de-multiplexing (WF demuxing) processor in a Ku-band array antenna with a multibeam DBF processor to form multiple orthogonal beams (OB) dynamically aggregating power and bandwidth of multiple tracked transponding satellites in accordance with some embodiments. It is a special case for a receiver configuration in FIG. 5c.

As depict in FIG. 5d, there are three sets of major functional blocks to implement WF muxing in a transmitter; a set of 3 serial-to-parallel (s2p) converters 1102, a M-to-M WF muxing unit 1103, and a set of 4 conventional multiplexer 1103a multiplexing multiple low speed data streams into a consolidated high speed stream. The conventional multiplexing may be TDM, FDM, CDM and/or combinations of all above. A 256-to-256 Hadamard transform will be used as a WF muxing 1103 device as the example. The 3 s2p devices 1102 may be programmable to dynamically allocate total bandwidth to three users.

Similarly there are four sets of major functional blocks to implement WF demuxing in a receiver; a set of 4 conventional de-multiplexer 333a, a M-to-M WF demuxing unit 3333, and a set of 3 parallel-to-series (p2s) converters 334 which perform the inverse functions of s2p units 1102 in the transmitter. A second 256-to-256 Hadamard transform will be used as a WF de-muxing device 333 as the example in a receiving processor 331. A set of 4 conventional de-multiplexing devices 333A shall perform the inverse processing of those in multiplexers 1103A at the transmitter, restructuring multiple low speed data streams from a consolidated high speed stream. The conventional de-multiplexing may be TDM, FDM, CDM and/or combinations of all above.

As depicted, there are three independent data streams to be transported via 4 transponders in three satellites from a source 110 to a fishing boat, such as the one 130-6 in FIG. 1. The three data streams are the same ones in FIG. 5c; identified as sA, sB, and sC. The three transponding satellites are identified as 120-1, 120-2, and 120-3. The reserved frequency slots with identical bandwidths in all three satellites feature a common center frequency.

A first signal stream, sA, after converted to multiple parallel substreams by a first serial-to-parallel (s2p) device 1102, will be connected to 64 of the 256 input ports of the WF muxer 1103. Similarly, a second signal stream sB, after a second s2p device, will be connected to a second 64 inputs of the remaining 192 input ports of the WF muxer 1103. The third data stream will be connected to 127 of the remaining 128 input ports. The last input port shall be assigned to a probing/diagnostic signal stream.

The input port assignments may not be contiguous for any users. The assignment sequences may be used for additional means for privacy protections in data transport via WF muxing/demuxing techniques.

The probing signals may be applied to more than one input ports continuously, or a small portion of available time, frequency or code slots of an input port or multiple input ports concurrently. In addition, probing signals ports may be used periodically and dynamically for authentication, redundancy for data streams, and/or security keys in different embodiments.

At any one of the 256 outputs of the WF muxing device 1103, the output value is a weighted sum of input data from the 256 input ports. There are 256 weighted sums; one for each output. A distribution of the weighting parameters for a first signal stream among the 256 outputs (corresponding to the 256 weighted sums) is a first wavefront vector (WF vector, WFV). There are 256 WF vectors (WFVs) which are mutually orthogonal for a 256-to-256 Hadamard transform. Occasionally, we refer to these WF vectors simply as wavefronts (WFs). The 256 outputs are referred as wavefront multiplexed (WF muxed) data streams, which are grouped into 4 consolidated WF muxed streams via a bank of 4 conventional 64-to-1 multiplexers 1103A. A first consolidated stream is delivered by a multibeam antenna, such as the one 440 in FIG. 4b, to an assigned first satellite transponder 120-1. Concurrently, a second consolidated stream is delivered by the same multibeam antenna, such as the one 440 in FIG. 4b, to an assigned second satellite transponder 120-2, and so on.

A common frequency slot is assigned for 4 Ku transponders covering the same fishing boat; two from a first satellite 120-1, one from a second satellite 120-2 and one from a third satellite 120-3. Normally, a multibeam antenna 110 at the uplink station is capable to deliver multiple independent data streams to the assigned transponders at a common frequency slot.

A conventional communications architecture might have followed a rule that the assigned frequency slot in the first transponder is to accommodate a first data stream, and so on. Any one of the 4 streams would appear in one of the 4 transponders only. As a result, the receiving antenna array 440 on the fishing boat 130-6 is capable of receiving various data streams from different transponders individually. Crew member A would receive a first data stream, sA, from the first transponder, crew member B would collect a second received data stream, sB, from the second transponder, and crew member C would access a combined data stream from a third received data stream, sC1, from the third transponder, and a $4^{th}$ data stream, sC2, from the $4^{th}$ transponder. The combining function from the two substream is performed by a post processor in receiver.

Alternatively with the WF muxing/demuxing architectures; any one of the 4 consolidated WF muxed streams will appear in one of the 4 transponders only, but any one of the original 3 user data streams and a probing/diagnostic signal stream will appear in all the 4 transponders with 4 sets of unique distributions.

In a receiving processing 331 before the demodulators 335 also depicted are a bank of 4 conventional 1-to-64 de-multiplexers 333A, a bank of 64 adaptive equalizers 332, a 256-to-256WF demuxing 333, and a set of three parallel to series (p2s) converters 334. The conventional demultiplexers 333A perform reverse functions of the associated multiplexers 1103A. The adaptive equalizers 332 will dynamically calibrate and compensate for the 4 path differentials in amplitudes and phases across selected frequency bands including effects among various transponding satellites 120 from the source 110 to the fishing boat 130-6 in the destination. The set of 3 p2s 334 are the reverse processing of those 1102 in the transmitting source 110.

The WF demuxing 333 on the fishing boat 130-6 is the inverse processing of the N-to-N WF muxing transform at the signal source of an uplink station 110, where N=256. There are three streams of data from the user group delivered to three crew members concurrently. The first two streams, sA and sB are identical flow rate, and the third one, sC, is flowing at nearly twice the rate of that of the first two. Less than 0.5% of total bandwidth (1/256) from space assets is allocated for calibration through the selection of only 1 of the 256 input ports for diagnostic and probing functions.

The depicted are for a forward link from a WF muxing 1103 as a preprocessing in a source transmission 110 ground a ground uplink, via multiple transponders 120s on various conventional satellites to a WF demuxing 333 as a post processing in a fishing boat 130-6. A return link architecture (not shown) will feature a WF muxing 1103 as a preprocessing in transmission on a fishing boat 130-6, via multiple transponders 120s on various conventional satellites to a WF demuxing 333 as a post processing in a receiver on ground station 110. The depicted transponders are assumed all available for frequency slots with same bandwidth in a common frequency. In general, WF muxing/demuxing architectures can be implemented with transponders which may only be available with various bandwidths at different frequency slots on multiple satellites.

FIG. 5d depict receiving functions with WF demuxing on a fishing boat for a special case of FIG. 5c for another embodiment. Only one of the three data stream is for a crew member on the fishing boat 130-6. The other two data streams are for crew members on other ships in a same common coverage by the three satellites 120s. As comparing the configuration to the one on FIG. 5b, functions of a wavefront de-multiplexing (WF demuxing) transformer 333 is identified in an Rx processor. There is a counter part of this, a WF muxing transform (not shown), in a ground hub 110, referred to FIG. 1a.

Figure 6A:
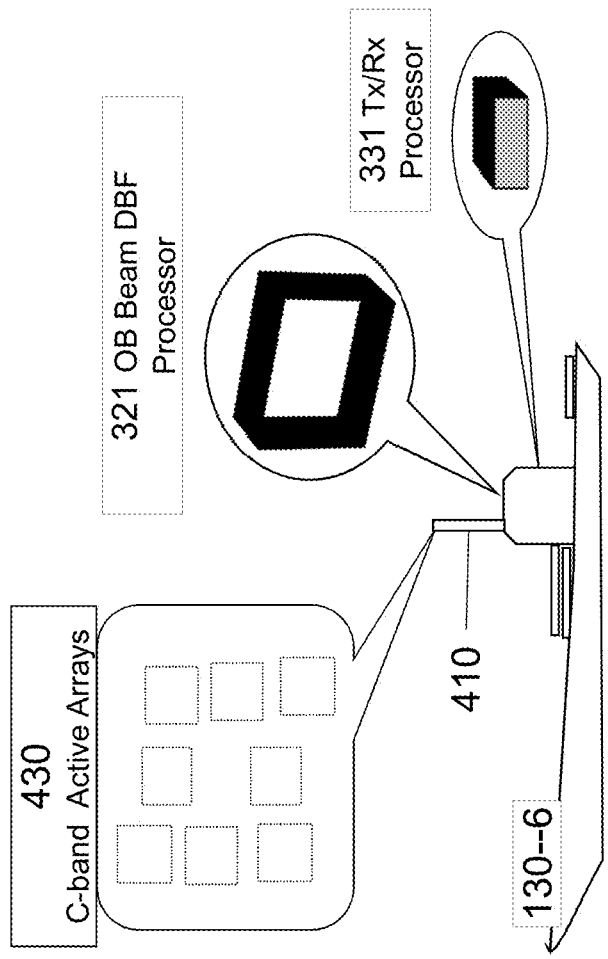
FIG. 6a depicts three major building blocks in a C-band mobile terminal; (1) a C-band active array, (2) a multibeam DBF processor to form multiple orthogonal beams (OB), a Tx/Rx processor including wavefront muxing/demuxing transforms, which dynamically aggregating power and bandwidth of multiple tracked transponding satellites in accordance with some embodiments.

FIG. 6 depicts three functional blocks for satellite communications on a C-band Mobile terminal as described in FIG. 3a. It is a two unit baseline design, a mast top unit and an in-cabin unit which comprising of a DBF processor 321 and a Tx/Rx processor 331. The mast top unit with a C-band active arrays 430 and their front ends features 7 to 10 C-band small distributed apertures or subarrays, each about 50 cm in diameter mounted on top of a ship-mast 410 of a commercial ocean vessel 130. A DBF processor 321 is remotely located in the in-cabin unit. The DBF shall form multiple beams which individually tracking individual satellites on the moving vessel. In some embodiments the DBF 321 performs beam forming for at least two tracking beams at both right-hand-circularly-polarized (RHCP) and left-hand-circularly-polarized (LHCP) toward a satellite with at least two linearly polarized (LP) transponders. Interconnects between the C-band array 430 mounted on top of the ship-mask 410 and its remote beam forming network 321 are mostly fiber base or wireless base. Cable interconnects, which is technically feasible but became very expensive due to high material cost in last decade, may not be a viable approach for low cost installations.

FIG. 7a depicts an alternate design of a distributed array on a mobile platform. There are 4 elements 711-1 to 711-4 for a C-band distributed array 711, but the elements are individually mechanical gimbaled apertures. In some embodiments, the array 711 with four 1-m diameter parabolic dishes is anchored over area 701 with ~2.6 m in diameter. Since the array features multiple discrete apertures, which can be mounted independently on s ship mast such as a one 410 in FIG. 6a. There are no beam forming mechanisms locally for interconnecting the array elements. Beam forming are performed remotely in an in-cabin unit.

Figure 7B:
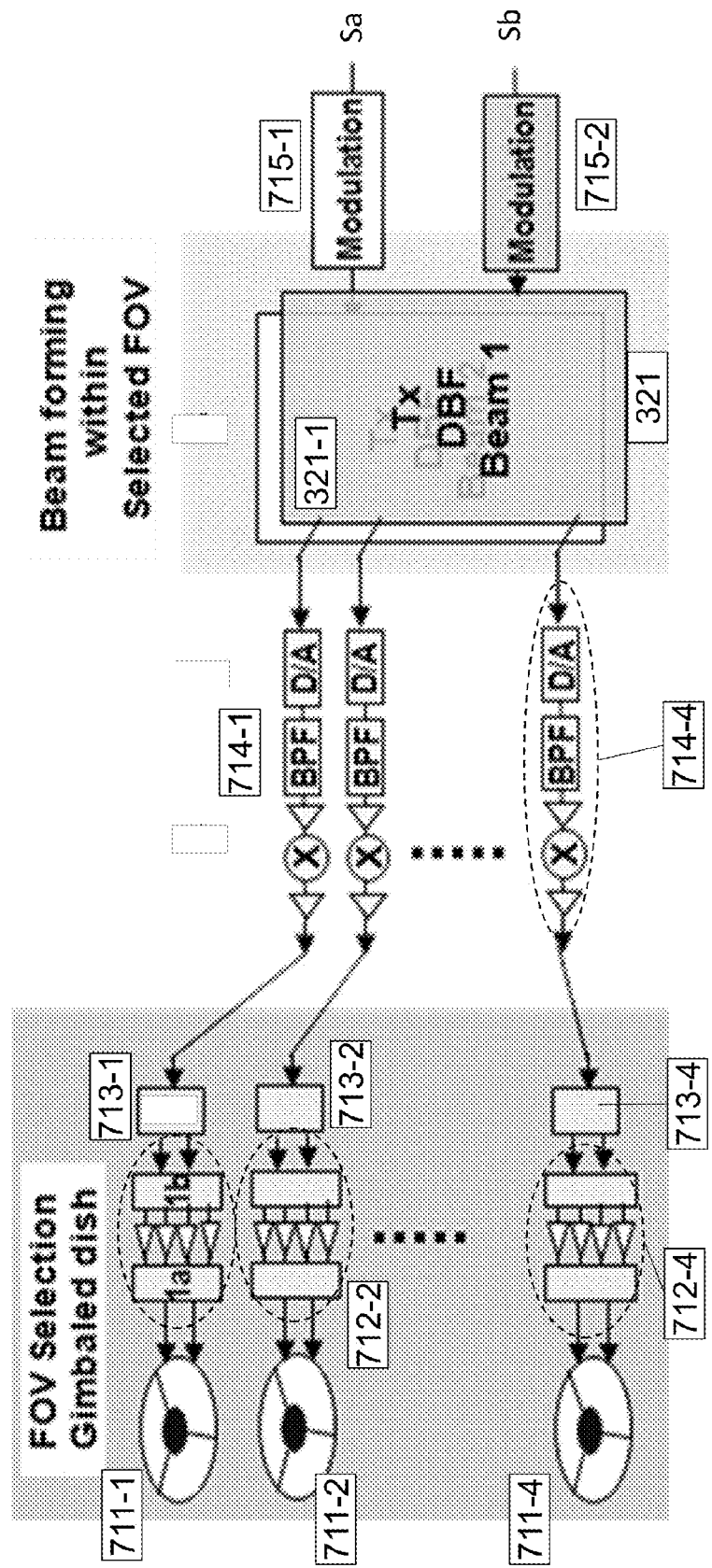
FIG. 7b depicts a block diagram for transmitting functions of 2 concurrent beams via the 4 element array in FIG. 7a in accordance with some embodiments.

FIG. 7b shows transmitting functions for the array 711 as a transmitting array to form to two independent tracking beams; a first beam for transporting Sa to a first satellite, and a second beam for transporting Sb to a second transponding satellite. The two independent transmitting beams share a set of power amplifier modules 712. There are to places performing beam pointing; one at the gimbaled dishes 711-1 to 711-4, and the other at remote beam forming processors 321-1 and 321-1. A gimbaled dish selects a relocatable but fixed sized instantaneous field-of-view (FOV) via a mechanical gimbals mechanism. The 4 gimbal dishes 711-1 to 711-4 may not be on a planar surface but their FOVs shall be pointed to a common range within which the two targeted satellites must be located. Each of the two DBF processors 321 will form a shaped beam tracking one of the two satellites continuously. The tracking shaped beam shall feature much sharper beam width, and better antenna gain than that from a single dish 711.

As the data stream Sa flows in FIG. 7b after converted to a waveform stream, it is sent to a first 1-to-4 DBF 321-1, in which Sa waveform stream is replicated 4 times and then individually weighted in both amplitude and phase according to a beam weighting vector (BWV) supplied and updated continuously by a beam controller (not shown). Similarly the Sb data stream will become 4 weighted replicates at the outputs of the second DBF 321-2. These two sets of 4 weighted replicates are individually sum-together. The 4 sums of individually weighted replicates are then converted from base-band digital formats to C-band analogue signals by a bank of 4 converter channels 714-1 to 714-4, followed by a bank of 4 hybrids, a bank to smart amplifier modules 712-1 to 712-4 before connected to the 4 gimbaled array elements 711-1 to 711-4. The dishes 711, smart amplifier modules 712, the hybrids 713 are built in an on-mast-top unit similar to the one 311 in FIG. 5a. The converters 714, DBFs 321, and modulators 715 are all in an in-cabin unit 371 in FIG. 5b. Interconnects between the two units may either be a fiber-based or be linked by wireless network.

Design-in Calibration Capability

Design-in real time calibration capability will significantly cut down the final integration-and-test (I & T) effort. The calibration is achieved through digital beam forming (DBF) processing and will include adjustments on time delays, amplitudes and phases among the subarrays through beam weight vectors (BWVs), each of which corresponds to a beam position. Since the subarrays of a distributed array may not be on regular plannar grids and BWV's are usually obtained through optimization process in range measurement as a part of calibration process. BWVs are highly dependent on the array geometries, and shall be calibrated periodically.

Cross-correlation techniques will facilitate the calibration, and I & T process, significantly reducing the burden on equalizing multiple parallel signal channels and on calibrating beam positions. With the design-in calibration capability for the distributed arrays, the precisions of the positions and orientations of the subarrays may be relaxed significantly. After final integration, the design-in calibration will perform cross-correlation measurements and update the BWV's accordingly. As a result, the position and orientation uncertainties will be completely compensated as a part of the calibration process.

Tracking Mechanisms

One of the important design features of SATCOM arrays on mobile platforms is a low cost tracking mechanism for the high gain low profile arrays. The arrays must generate beams continuously pointed to targeted satellite directions even as the vehicle in high maneuvering modes.

Figure 8:
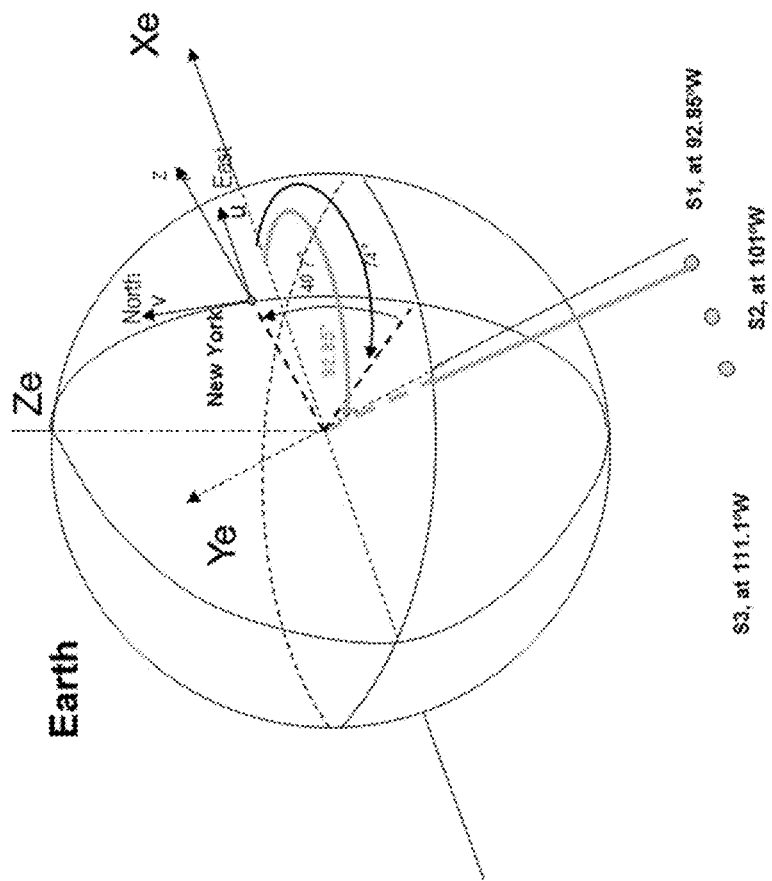
FIG. 8 depicts relationships in a earth centered coordinate of three satellites; S1, S2, and S3, in GEO orbit slots and a mobile terminal on a moving ground platform in New-York City bearing north in accordance with some embodiments.
Figure 9:
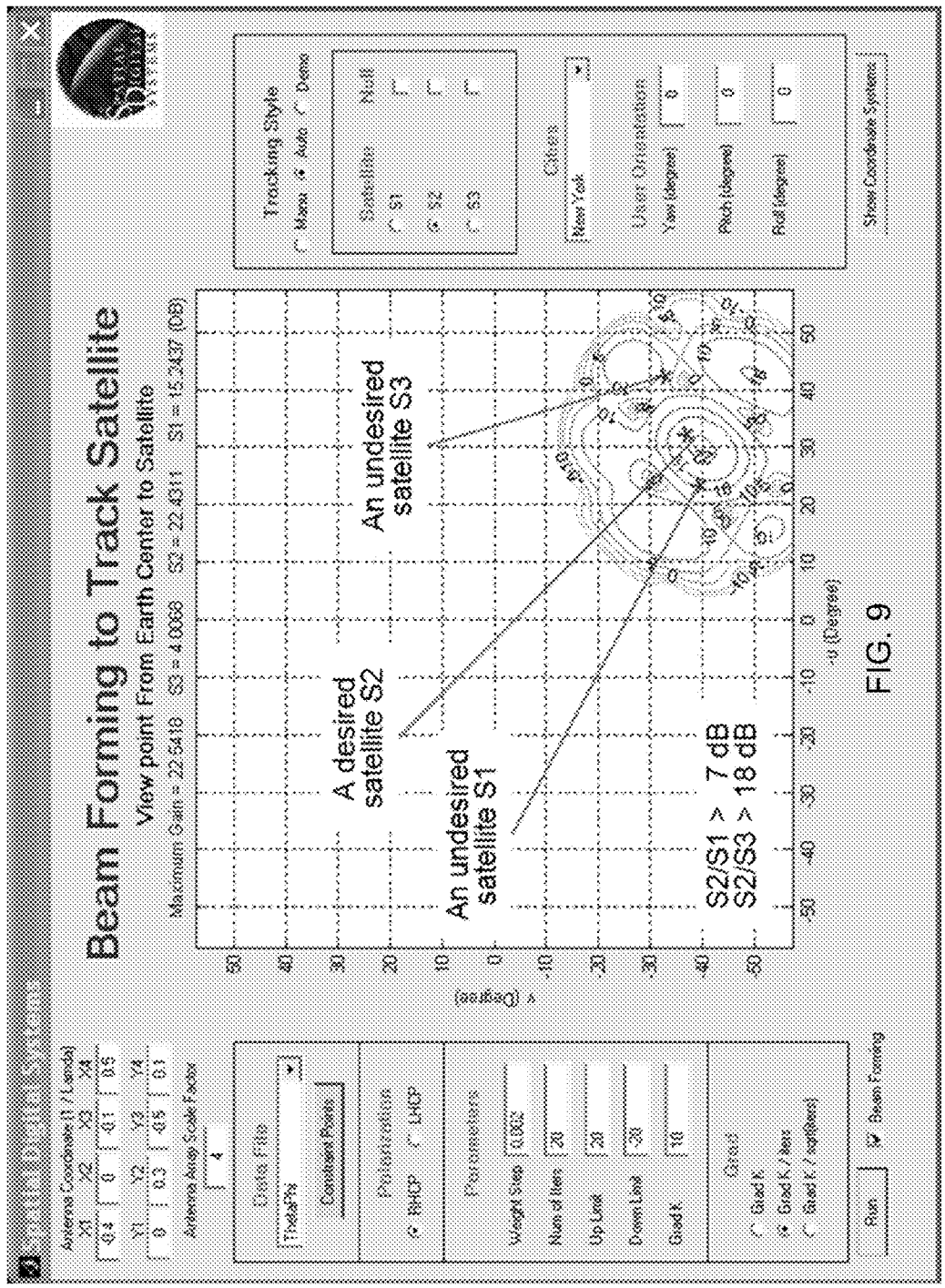
FIG. 9 depicts a snap shot of the dynamic receiving patterns from a 4 element array on the moving platform in FIG. 8. The depicted array receiving pattern is a result of an optimization based on a performance constraint of forming beam peak toward the direction pointed to S2 satellite in accordance with some embodiments.
Figure 10:
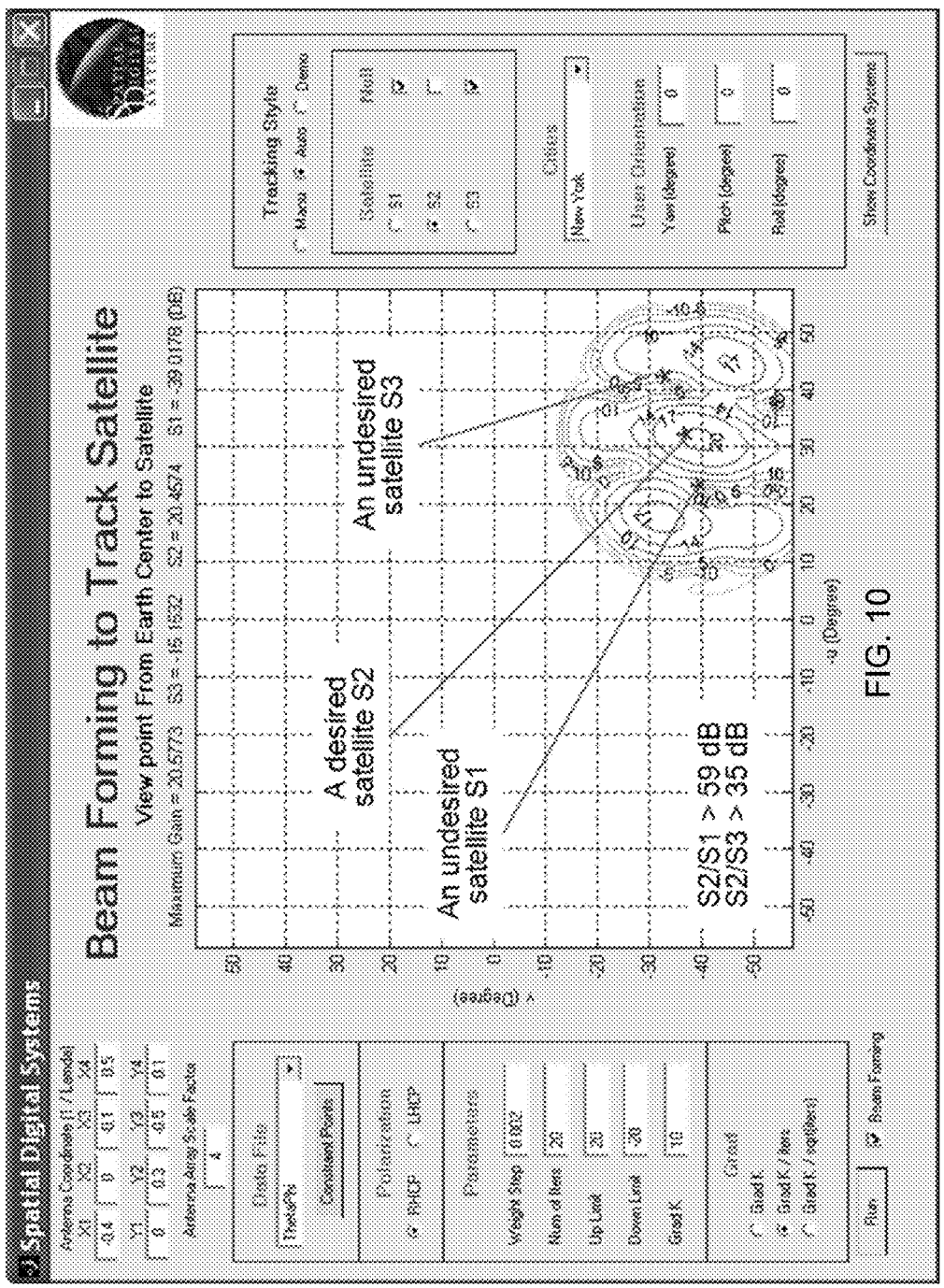
FIG. 10 depicts a snap shot of the dynamic receiving patterns from the same 4 element array on the moving platform in FIG. 8. The depicted array receiving pattern is a result of an optimization based on three concurrent performance constraints; (1) forming beam peak toward the direction pointed to S2 satellite, (2) steering a beam null toward the direction pointed to S1 satellite, and (3) steering a beam null toward the direction pointed to S3 satellite.

FIG. 8, FIG. 9, and FIG. 10 are to demonstrate the adequate satellite tracking using real time optimizations to achieve functional OB beams on a moving platforms. However, since they are not videos, we can only show features of displayed reception patterns from a distributed antenna with 4 elements on a moving ground vehicle. in NY city.

Two techniques for the dynamic beam-weight-vector (BWV) updates are practical; (1) table lookup based on none-real time retro-directivities, and (2) based on real time beam shape optimization.

FIG. 8 illustrates a snap shot of geometry of a mobile platform moving in New York City with respect to three S-band satellites in geostationary orbit. It depicts the Coordinate for a mobile platform in the city of New York with respected to three targeted satellites (S1, S2, and S3) in geostationary orbit. In this example, three satellites, S1, S2, and S3, are targeted. There are all in the geostationary orbit at the longitudes of 92.85° w, 101° w, and 111.1° w, respectively.

FIG. 9 depicts a dynamic radiation pattern of one of the multiple tracking beams on the ground mobile terminal using real time beam shaping optimization under constraints of directions of beam peaks only. They are parts of graphical interfaces between the mobile terminal and its user, illustrating snapshots of the dynamic radiation contour patterns in UV space of three simultaneous beams generated by a distributed aperture. The graphic displays also depict the information on the terminal orientation in UV space and the target satellite locations and directions with the pitch, yaw and roll effects of the moving vehicle. There are three targeted potential satellites at S-band; satellite S1 near ~93° W, satellite S2 at ~101° W, and satellite S3 at ~111° W.

The distributed aperture at S-band features three simultaneous beams and consists of 4 randomly spaced subarrays with maximum spacing about 4λ. We demonstrate the beam tracking capability using a real time and highly efficient beam shaping optimization program, and therefore has displayed the array factor and all the element pattern effects on the snapshots of dynamic radiation patterns.

The moving platform is due north, moving on a flat ground surface. This beam is commanded to point at the second satellite, S2 at 101° w longitude. The shaped beam by the efficient optimization program features a ~20 dB peak gain near S2 satellite, a 15 dB gain toward S1 satellite direction, and 4 dB gain at S3 satellite direction, providing a directional isolation S2/S1 only by −5 dB, and that of S3/S1 by −16 dB. These isolation levels are short of nominal specifications of −25 dB.

FIG. 10 depicts reception patterns of the same array but with additional directional constraints on the beam shaping process as those in FIG. 9. The reception dynamic pattern is a result of optimization with constraints on beam peaks and nulls. The radiation pattern snapshot of the shaped beam shown has a beam peak of ~20 dB at the Satellite S2 direction (u=~32° and v=~−37°, and two separated nulls towards Satellites S1 (u=~23.5°, v=~−40°) with ~−39 dB gain and S3 (u=~41° and v=~−32°) with −15 dB gain, respectively. As a result of additional constraints in the optimization, the shaped beam delivers i. A peak gain of ~29 dB at the direction of S2 satellite
ii. Isolation to the direction of S1 with a directional discrimination S1/S2 of −59 dB,
iii. Isolation to the direction of S3 with a directional discrimination S3/S2 of −35 dB Furthermore, the radiation pattern of a second dynamic shaped beam (not shown) shall be peaked at Satellite S2, and features two nulls at the directions of Satellite S2 and S3, respectively. The radiation pattern of the third dynamic shaped beam (not shown) shall be always peaked at Satellite S3, featuring two nulls pointing at the directions of Satellite S2 and S1, respectively, as the platform. is dynamically moving.

There are alternatives in implementations; such as the following three

L-Band Interconnections

Subarrays 711 are interconnected and become an array antenna to form transmit and receive beams by (flexible) digital beam forming (DBF) networks at base-band. The interconnection between the subarrays and a central DBF processor performing DBF may be coaxial cables at L-band or short distance active fibers with I/O at L-band.

Subarrays to Perform FOV Selection

Using receive (Rx) functions as example, the subarray beam forming process takes advantages of Bulter Matrixes and Switch Matrixes, reducing available field of view (FOV) of individual elements to a selected FOV of subarrays covering targeted satellites before further processing.

Low Profile Elements and Subarrays (or Small Gimbaled Dishes)

To avoid the presence of high physical profile for Satcom array antennas on moving vehicles, low profile radiating elements may be used. Using cost as a key design driver, subarrays using printed circuit boards are proposed as the modular building blocks, which include multiple low profile elements and beam-forming and switching capabilities. There are no moving parts, no phase shifters. The size of a plannar subarray will be about 5λ to 10λ. We may use Duroid or LTCC for C-band subarrays, and LTCC for Ku band low profile subarrays.

Alternatively, small dishes about 10λ in diameter with two-axis-gimbals may be used to replace the subarrays. The small dishes are anchored and gimbaled independently to select the proper FOV for DBF. This is the most efficient and the lowest cost approach but it will have relatively high physical profiles, and can support multi-beam efficiently only when the beam positions are all within the selected FOV.

What is claimed is:

1. A communications system for two-way communication via a plurality of transponders including a first transponder and a second transponder, the communications system comprising:
   a terminal on a moving platform comprising:
      a local hub for communicating wirelessly with user devices onboard the moving platform, the local hub receiving independent streams of information from the user devices;
      a wavefront multiplexing processor coupled to the local hub, the wavefront multiplexing processor processing the independent streams of information and generating a first stream of data and a second stream of data;
      an array antenna comprising a plurality of discrete antenna elements arranged as a distributed array;
      a beam forming network coupled to the array antenna and the wavefront multiplexing processor, the beam forming network forming a plurality of concurrent tracking beams for the antenna elements to track at least the first and second transponders, the concurrent tracking beams including a first tracking beam to transmit the first stream of data to the first transponder and a second tracking beam to transmit the second stream of data to the second transponder; and
   a ground hub on land configured to receive the first stream of data from the first transponder and the second stream of data from the second transponder, the first stream of data and the second stream of data being destined for the ground hub.

2. The communications system of claim 1, wherein the beam forming network is configured to form the first and second tracking beams under multiple concurrent constraints such that radiation patterns of the first and second tracking beams have peak power in respective directions toward the first transponder and the second transponder and have power close to nulls in directions toward remaining ones of the transponders.

3. The communications system of claim 1, wherein the first transponder and the second transponder are on a satellite, the first transponder receiving the first stream of data in one of a first frequency slot and a second frequency slot, the second transponder receiving the second stream of data in one of the first frequency slot and the second frequency slot.

4. The communications system of claim 1, wherein the first transponder and the second transponder are configured to operate in linear polarizations.

5. The communications system of claim 1, wherein the first transponder and the second transponder are configured to operate in circular polarizations.

6. The communications system of claim 1, wherein the first transponder is on a first satellite and the second transponder is on a second satellite, the first transponder receiving the first stream of data in one of a first frequency slot and a second frequency slot, the second transponder receiving the second stream of data in one of the first frequency slot and the second frequency slot.

7. The communications system of claim 1, wherein the first transponder is on a first satellite and the second transponder is on a second satellite, the first satellite and the second satellite are in different orbital slots.

8. The communications system of claim 1, wherein the moving platform comprises a mobile vehicle.

9. The communications system of claim 1, wherein the first and the second transponders are configured to receive respectively the first stream of data and the second stream of data from the terminal over a common frequency slot.

10. The communications system of claim 1 further comprising a second terminal on a second moving platform, wherein the second terminal is configured to transmit a third stream of data to the first transponder and a fourth stream of data to the second transponder.

11. The communications system of claim 1, wherein the ground hub is at a fixed site on land.

12. The communications system of claim 1, wherein the ground hub is on a mobile platform.

13. A communications system for two-way communication via a plurality of transponders, comprising:
  a transmitter in a ground hub on land configured to wavefront-multiplex a plurality of streams of information and generate a plurality of wavefront multiplexed signals, each of the wavefront multiplexed signals being a weighted sum of the streams of information, the transmitter being configured to send the wavefront multiplexed signals to a terminal on a moving platform via at least two of the transponders; and
  the terminal on the moving platform comprising:
    an array antenna comprising a plurality of discrete antenna elements arranged as a distributed array to receive the wavefront multiplexed signals from the at least two transponders;
    a wavefront demultiplexing processor coupled to the array antenna, the wavefront demultiplexing processor processing the received wavefront multiplexed signals to recover the streams of information; and
    a local hub coupled to the wavefront demultiplexing processor, the local hub receiving the recovered streams of information, and delivering wirelessly to respective user devices onboard the moving platform any of the recovered streams of information that are identified as destined for the respective user devices.

14. The communications system of claim 13, wherein the transmitter comprises a beam shaping processor configured to form a plurality of concurrent transmitting orthogonal beams at a common frequency slot.

15. The communications system of claim 13, wherein the terminal is configured to calibrate multiple path differentials in amplitudes and phases across multiple frequency bands from the transmitter to the terminal.

16. The communications system of claim 13, wherein the transmitter is configured to send the wavefront multiplexed signals to the at least two transponders at a common frequency slot.

17. The communications system of claim 13, wherein the at least two transponders are on at least two different satellites.

18. A communications system for two-way communication via a plurality of transponders, comprising:
  a terminal on a moving platform, comprising:
    a local hub for communicating wirelessly with user devices onboard the moving platform, the local hub being configured to receive independent streams of information from the user devices;
    a wavefront multiplexing processor coupled to the local hub, the wavefront multiplexing processor being configured to process the received independent streams of information and generate a plurality of wavefront multiplexed signals; and
    an array antenna coupled to the wavefront multiplexing processor, the array antenna comprising a plurality of discrete antenna elements arranged as a distributed array to transmit the wavefront multiplexed signals to at least two of the transponders; and
  a ground hub on land configured to receive the wavefront multiplexed signals from the at least two transponders and to wavefront demultiplex the received wavefront multiplexed signals to recover the independent streams of information.

19. The communications system of claim 18, wherein the at least two transponders are on at least two different satellites.

* * * * *